US007508865B2

(12) United States Patent
Miller et al.

(10) Patent No.: US 7,508,865 B2
(45) Date of Patent: Mar. 24, 2009

(54) SYSTEM AND METHOD FOR TRACKING AN ULTRAWIDE BANDWIDTH SIGNAL

(75) Inventors: Timothy R. Miller, Washington, DC (US); Martin Rofheart, Washington, DC (US)

(73) Assignee: Freescale Semiconductor, Inc., Austin, TX (US)

( * ) Notice: Subject to any disclaimer, the term of this patent is extended or adjusted under 35 U.S.C. 154(b) by 274 days.

(21) Appl. No.: 11/098,419

(22) Filed: Apr. 5, 2005

(65) Prior Publication Data
US 2005/0175076 A1    Aug. 11, 2005

Related U.S. Application Data

(62) Division of application No. 09/685,195, filed on Oct. 10, 2000, now Pat. No. 6,925,108.

(60) Provisional application No. 60/217,099, filed on Jul. 10, 2000, provisional application No. 60/207,225, filed on May 26, 2000.

(51) Int. Cl.
*H04B 1/00* (2006.01)

(52) U.S. Cl. .................. 375/150; 375/142; 375/143; 375/152; 375/343

(58) Field of Classification Search ................ 375/150, 375/130, 136, 137, 147, 142, 295, 346, 143, 375/152, 343
See application file for complete search history.

(56) References Cited

U.S. PATENT DOCUMENTS

| 5,289,476 | A | | 2/1994 | Johnson et al. | |
|---|---|---|---|---|---|
| 5,677,927 | A | | 10/1997 | Fullerton et al. | |
| 5,748,891 | A | * | 5/1998 | Fleming et al. | ............. 375/150 |
| 6,088,384 | A | * | 7/2000 | Hindman | ................... 375/150 |
| 6,198,765 | B1 | * | 3/2001 | Cahn et al. | ................... 375/142 |
| 6,239,741 | B1 | * | 5/2001 | Fontana et al. | ............... 342/135 |
| 6,351,246 | B1 | | 2/2002 | McCorkle | |
| 6,505,032 | B1 | | 1/2003 | McCorkle | |
| 6,603,818 | B1 | * | 8/2003 | Dress et al. | .................. 375/295 |
| 6,658,048 | B1 | * | 12/2003 | Valio | .......................... 375/150 |
| 6,700,939 | B1 | | 2/2004 | McCorkle | |
| 6,735,238 | B1 | | 5/2004 | McCorkle | |
| 6,735,242 | B1 | * | 5/2004 | Kenney et al. | ............... 375/150 |
| 2003/0053555 | A1 | * | 3/2003 | McCorkle et al. | ........... 375/295 |
| 2004/0190641 | A1 | * | 9/2004 | Ojard | ......................... 375/261 |

OTHER PUBLICATIONS

U.S. Appl. No. 60/207,225, filed May 26, 2000, McCorkle.
U.S. Appl. No. 60/217,099, filed Jul. 10, 2000, Miller.
U.S. Appl. No. 09/633,815, filed Aug. 7, 2000, McCorkle.
U.S. Appl. No. 60/238,466, filed Oct. 10, 2000, McCorkle.
U.S. Appl. No. 09/684,401, filed Oct. 10, 2000, Miller.
U.S. Appl. No. 09/684,782, filed Oct. 10, 2000, McCorkle.

(Continued)

*Primary Examiner*—Ted Wang

(57) ABSTRACT

A system and method for fast synchronization of an incoming signal with a UWB receiver. The present invention synchronizes a UWB receiver with an incoming signal. The present invention correlates a local pulse generated at the receiver with the incoming signal, finds the value in the correlation function that would correspond to a high signal to noise ratio, thereby matching the receiver to the incoming signal phase, and operates the receiver at that phase. Exemplary options of fast synchronization include a maximum peak detector.

16 Claims, 25 Drawing Sheets

OTHER PUBLICATIONS

U.S. Appl. No. 09/685,196, filed Oct. 10, 2000, Miller.
U.S. Appl. No. 09/685,197, filed Oct. 10, 2000, Miller.
U.S. Appl. No. 09/685,198, filed Oct. 10, 2000, McCorkle.
U.S. Appl. No. 09/682,199, filed Oct. 10, 2000, McCorkle.
U.S. Appl. No. 09/685,200, filed Oct. 10, 2000, McCorkle.
U.S. Appl. No. 09/685,202, filed Oct. 10, 2000, Rofheart.
U.S. Appl. No. 09/685,203, filed Oct. 10, 2000, Miller.
U.S. Appl. No. 09/685,205, filed Oct. 10, 2000, McCorkle.

Win et al., IEEE Transactions on Communications, vol. 48, No. 4, pp. 679-691, "Ultra-Wide Bandwidth Time-Hopping Spread-Spectrum Impulse Radio for Wireless Multiple-Access Communications", Apr. 2000.

Win et al., Annual Military Communications Conference, vol. 3, pp. 1277-1281, "Energy Capture vs. Correlator Resources in Ultra-Wide Bandwidth Indoor Wireless Communications Channels", Nov. 3, 1997.

\* cited by examiner

SYSTEM AND METHOD FOR TRACKING AN ULTRAWIDE BANDWIDTH SIGNAL

CROSS-REFERENCE TO RELATED PATENT DOCUMENTS

The present application is a divisional application of U.S. patent application Ser. No. 09/685,195, now U.S. Pat. No. 6,925,108, filed Oct. 10, 2000, entitled ULTRAWIDE BANDWIDTH SYSTEM AND METHOD FOR FAST SYNCHRONIZATION, which relies for priority on U.S. provisional application Ser. No. 60/207,225, filed May 26, 2000, entitled ULTRAWIDEBAND COMMUNICATION SYSTEM AND METHOD, and U.S. provisional application Ser. No. 60/217,099, filed Jul. 10, 2000, entitled MULTIMEDIA WIRELESS PERSONAL AREA NETWORK (WPAN) PHYSICAL LAYER SYSTEM AND METHOD.

The present document contains subject matter related to that disclosed in commonly owned, application Ser. No. 09/209,460, now issued as U.S. Pat. No. 6,700,939, filed Dec. 11, 1998, entitled ULTRA WIDE BANDWIDTH SPREAD-SPECTRUM COMMIUNICATIONS SYSTEM; Ser. No. 09/633,815 filed Aug. 7, 2000, entitled ELECTRICALLY SMALL PLANAR UWB ANTENNA; application Ser. No. 09/563,292 filed May 3, 2000, entitled PLANAR ULTRA WIDE BAND ANTENNA WITH INTEGRATED ELECTRONICS; Application Ser. No. 60/207,225 filed May 26, 2000, entitled ULTRA WIDEBAND COMMUNICATION SYSTEM AND METHOD; application Ser. No. 09/685,198 filed Oct. 10, 2000, entitled ANALOG SIGNAL SEPARATOR FOR UWB VERSUS NARROWBAND SIGNALS; Application Ser. No. 60/238,466 filed Oct. 10, 2000, entitled ULTRA WIDE BANDWIDTH NOISE CANCELLATION MECHANISM AND METHOD; Application Ser. No. 60/217,099 filed Jul. 10, 2000, entitled MULTIMEDIA WIRELESS PERSONAL AREA NETWORK (WPAN) PHYSICAL LAYER SYSTEM AND METHOD; application Ser. No. 09/685,203 filed Oct. 10, 2000, entitled SYSTEM AND METHOD FOR BASEBAND REMOVAL OF NARROWBAND INTERFERENCE IN ULTRA WIDEBAND SIGNALS; application Ser. No. 09/685,197 filed Oct. 10, 2000, entitled MODE CONTROLLER FOR SIGNAL ACQUISITION AND TRACKING IN AN ULTRA WIDEBAND COMMUNICATION SYSTEM; application Ser. No. 09/684,400 filed Oct. 10, 2000, entitled ULTRA WIDEBAND COMMUNICATION SYSTEM, METHOD, AND DEVICE WITH LOW NOISE PULSE FORMATION; application Ser. No. 09/684,401 filed Oct. 10, 2000, entitled ULTRA WIDE BANDWIDTH SYSTEM AND METHOD FOR FAST SYNCHRONIZATION USING SUB CODE SPINS; application Ser. No. 09/685,196 filed Oct. 10, 2000, entitled ULTRA WIDE BANDWIDTH SYSTEM AND METHOD FOR FAST SYNCHRONIZATION USING MULTIPLE DETECTION ARMS; application Ser. No. 09/685,199 filed Oct. 10, 2000, entitled A LOW POWER, HIGH RESOLUTION TIMING GENERATOR FOR ULTRA-WIDE BANDWIDTH COMMUNICATION SYSTEMS; application Ser. No. 09/685,202 filed Oct. 10, 2000, entitled METHOD AND SYSTEM FOR ENABLING DEVICE FUNCTIONS BASED ON DISTANCE INFORMATION; application Ser. No. 09/685,201 filed Oct. 10, 2000, entitled CARRIERLESS ULTRA WIDEBAND WIRELESS SIGNALS FOR CONVEYING APPLICATION DATA; application Ser. No. 09/685,205 filed Oct. 10, 2000, entitled SYSTEM AND METHOD FOR GENERATING ULTRA WIDEBAND PULSES; application Ser. No. 09/684,782 filed Oct. 10, 2000, entitled ULTRA WIDEBAND COMMUNICATION SYSTEM, METHOD, AND DEVICE WITH LOW NOISE RECEPTION; and application Ser. No. 09/685,200 filed Oct. 10, 2000, entitled LEAKAGE NULLING RECEIVER CORRELATOR STRUCTURE AND METHOD FOR ULTRA WIDE BANDWIDTH COMMUNICATION SYSTEM, the entire contents of each of which being incorporated herein by reference.

BACKGROUND OF THE INVENTION

1. Field of the Invention

The present invention relates to radio frequency communication receivers, systems, and methods employing ultra wide bandwidth (UWB) signaling techniques. UWB is a term of art meaning that the signal bandwidth is equal to 25% or more of the center frequency. More particularly, the present invention relates to UWB communication transceivers, receivers, systems, and methods configured to perform fast synchronization on an incoming UWB signal.

2. Discussion of the Background

In UWB communication systems, a transmitter embeds data in a signal that can propagate in a desired medium so that a receiver at a distant location can then extract information from the incoming signal. The transmitter clock and the receiver clock are usually not initially synchronized. However, in order to accurately extract the information from the incoming signal, the receiver clock should be synchronized with the incoming (received) signal. Fast synchronization is desirable because the faster the receiver is synchronized with the incoming signal, the faster the receiver achieves an acceptable quality of service, the higher the average throughput, and the lower the latency in the communicated data.

Many radios have some type of synchronization, also referred to as clock recovery, incorporated into the receiver. In narrowband communication systems, synchronization typically takes place by locking onto a carrier signal that is a narrowband tone, which can be isolated with a narrow bandpass filter. This form of operation (i.e. correlating with a sine wave via a narrowband filter) generally cannot be done in UWB systems because they are purposely designed not to emit any tones. Instead they send noise-like code sequences that appear like noise and mimic noise in standard narrowband receivers. As a result, synchronization is accomplished by correlating with the noise-like code sequence that was transmitted. Since a programmable real-time filter whose impulse response is a matched filter to the noise-like code sequence is difficult to build, a sliding correlator is typically used to acquire and track the signal. The sliding correlator is built by applying the noise-like sequence into a mixer/multiplier (e.g. the local oscillator LO port) and applying the received signal into the other port (i.e. the RF port), integrating the mixer output signal over the duration of the known noise code, and collecting a string of values comprised of the integration values. If the frequency of the clock used at the transmitter to encode the data does not precisely match the receiver clock frequency, then the two sequences (i.e. that applied to the RF port, and that provided to the LO port) at the receiver "slide" in phase (or time) relative to one another. At some point in time, the string of correlation values will peak to the largest absolute value, indicating that the two sequences are time (or phase) aligned. As they continue to slide in phase, a repeating pattern will result that is the cyclic autocorrelation function of the noise-like code sequence. Because the output of the sliding correlator is cyclic, the process of moving the phase of the receiver relative to the transmitter through one cycle is often referred to as a "code wheel spin." To guarantee that the largest absolute value of the correlation function is obtained, the code wheel must be allowed to spin at least one full cycle. In order to synchronize to the largest term, the receiver timing must have a mechanism to locate and then "lock onto" the largest peak by getting both the frequency and phase of its clock matched to the incoming signal. In the noiseless case, this mechanism can be simple and robust. But with real noise experienced by UWB receivers, the mechanism must be more complex and collect statistics in order to be robust.

Conventional UWB systems perform synchronization on an incoming signal modulated by pulse position modulation (PPM), where the temporal position of the pulses that constitute the incoming signal vary based on the data and the noise-like code sequence. Since the code sequence is long and spans many bits, and since the pulse repetition rate is slow (e.g. 10 MHz and lower), it takes a relatively long time to synchronize the receiver with the incoming signal.

UWB systems that use high chip rates (e.g. >1 GHz) to spread their spectrum, can cycle through a code of the same length much faster and thus synchronize faster. Nonetheless, the high sustained throughput requirements of newer applications such as streaming real-time video and multi-media in the context of multi-user networked systems gives rise to a need for faster synchronization so that more time is spent communicating data, and less time is spent synchronizing.

Most radios must operate in multipath environments. In multipath environments, more than one transmission path exists between the transmitter and receiver. Narrowband radios suffer in multipath environments due to the frequency selective nature of the phenomena. Narrowband radios can employ RAKE receiver structures to combine signals from the multiple paths, but this is a difficult and expensive process since narrowband systems lack the time-domain resolution to easily resolve the multipath terms.

By definition, UWB systems have high time-domain resolution, and thus can resolve the multipath signals. But the multipath signals lie within the modulation domain of UWB PPM systems, and the multipath environment can be unstable over the long coding periods of these systems.

High chip rate UWB systems have the advantage of operating in quasi-stationary multipath environments where the multipath is changing much slower than the code duration. In addition, UWB systems employing modulation schemes other than PPM do not as much difficulty with multipath corruption of the modulation. Such systems are better suited to cope with multipath environments.

The challenge, as recognized by the present inventors, is to perform fast synchronization so as to quickly obtain the best achievable signal quality, yet do it with high reliability and at a cost that is commensurate with extremely cost sensitive consumer electronics equipment.

SUMMARY OF THE INVENTION

Consistent with the title of this section, only a brief description of selected features of the present invention is presented. A more complete description of the present invention is the subject of this entire document.

An object of the present invention is to provide a method and a UWB receiver that includes a synchronization mechanism for synchronizing the receiver with an incoming signal in order to phase lock to the incoming UWB signal.

Another object of the present invention is to provide a method and a UWB receiver that includes a fast synchronization mechanism for rapidly recognizing and synchronizing with the strongest incoming signal.

Another object of the present invention is to address the above-identified and other deficiencies of conventional UWB communication systems and methods.

These and other objects are accomplished by way of a UWB receiver configured to receive UWB transmission schemes. An exemplary embodiment includes a maximum magnitude correlation (peak) detector. This embodiment will determine when the receiver has been synchronized with an incoming signal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
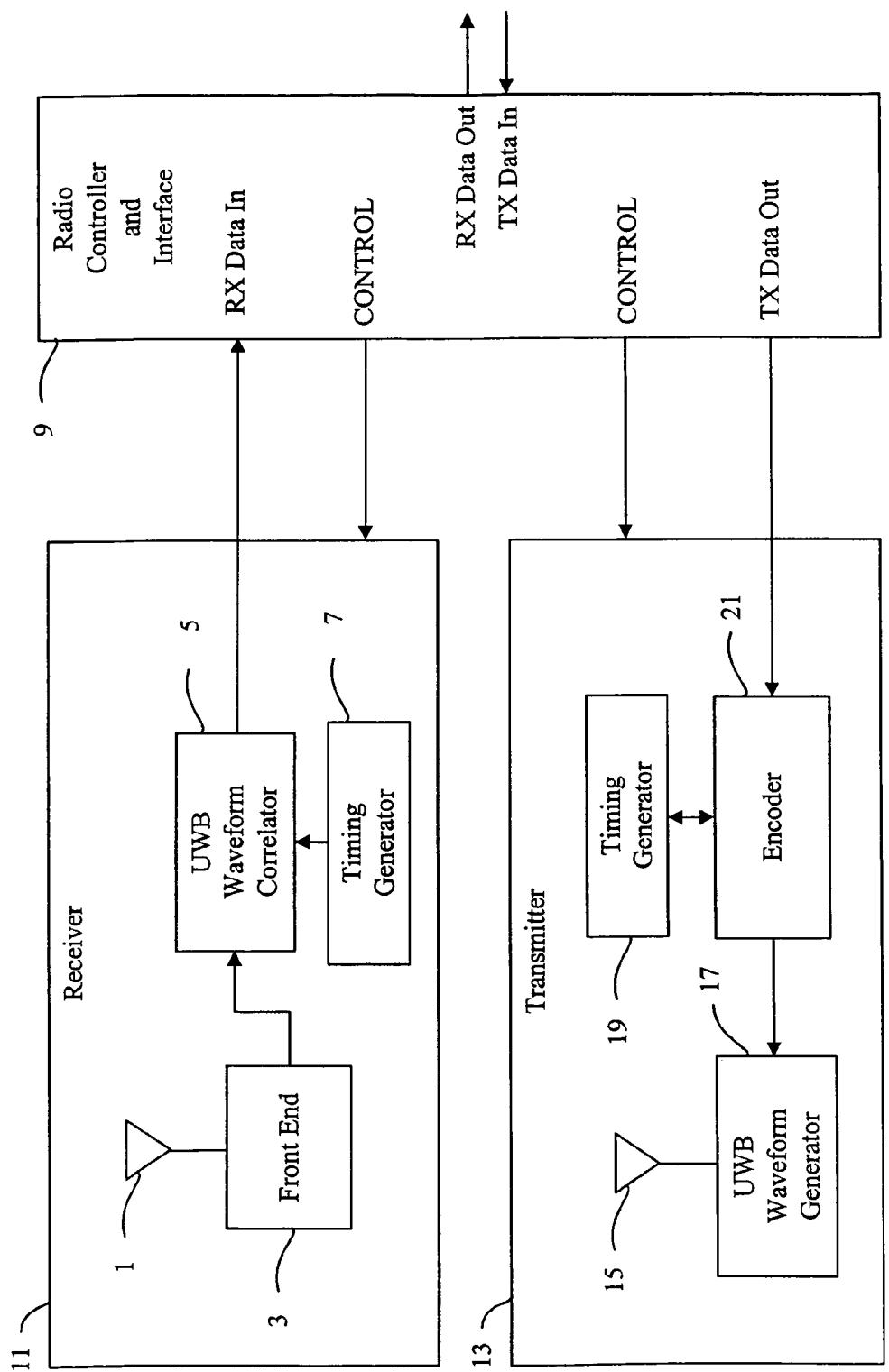
FIG. 1a is a block diagram of an ultra-wide band (UWB) transceiver, according to the present invention.

Referring now to the drawings, wherein like reference numerals designate identical or corresponding parts throughout the several views.

FIG. 1a is a block diagram of an ultra-wide band (UWB) transceiver. In FIG. 1a, the transceiver includes three major components, namely, receiver 11, radio controller and interface 9, and transmitter 13. Alternatively, the system may be implemented as a separate receiver 11 and radio controller and interface 9, and a separate transmitter 13 and radio controller and interface 9. The radio controller and interface 9 serves as a media access control (MAC) interface between the UWB wireless communication functions implemented by the receiver 11 and transmitter 13 and applications that use the UWB communications channel for exchanging data with remote devices.

The receiver 11 includes an antenna 1 that converts a UWB electromagnetic waveform into an electrical signal (or optical signal) for subsequent processing. The UWB signal is generated with a sequence of shape-modulated wavelets, where the occurrence times of the shape-modulated wavelets may also be modulated. For analog modulation, at least one of the shape control parameters is modulated with the analog signal. More typically, the wavelets take on M possible shapes. Digital information is encoded to use one or a combination of the M wavelet shapes and occurrence times to communicate information.

In one embodiment of the present invention, each wavelet communicates one bit, for example, using two shapes such as bi-phase. In other embodiments of the present invention, each wavelet may be configured to communicate nn bits, where $M \geq 2^{nn}$. For example, four shapes may be configured to communicate two bits, such as with quadrature phase or four-level amplitude modulation. In another embodiment of the present invention, each wavelet is a "chip" in a code sequence, where the sequence, as a group, communicates one or more bits. The code can be M-ary at the chip level, choosing from M possible shapes for each chip.

At the chip, or wavelet level, embodiments of the present invention produce UWB waveforms. The UWB waveforms are modulated by a variety of techniques including but not limited to: (i) bi-phase modulated signals (+1, −1), (ii) multilevel bi-phase signals (+1, −1, +a1, −a1, +a2, −a2, . . . , +aN, −aN), (iii) quadrature phase signals (+1, −1, +j, −j), (iv) multi-phase signals (1, −1, exp(+jπ/N), exp(−jπ/N), exp(+jπ2/N), exp(−jπ2/N), . . . , exp(+j(N−1)/N), exp(−jπ(N−1)/N)), (v) multilevel multi-phase signals ($a_i \exp(j2\pi\beta/N) | a_i \in \{1, a1, a2, \ldots, aK\}, \beta \in \{0, 1, \ldots, N-1\}$), (vi) frequency modulated pulses, (vii) pulse position modulation (PPM) signals (possibly same shape pulse transmitted in different candidate time slots), (viii) M-ary modulated waveforms $g_{B_i}(t)$ with $B_i \in \{1, \ldots, M\}$, and (ix) any combination of the above waveforms, such as multi-phase channel symbols transmitted according to a chirping signaling scheme. The present invention, however, is applicable to variations of the above modulation schemes and other modulation schemes (e.g., as described in Lathi, "Modern Digital and Analog Communications Systems," Holt, Rinehart and Winston, 1998, the entire contents of which is incorporated by reference herein), as will be appreciated by those skilled in the relevant art(s).

Some exemplary waveforms and characteristic equations thereof will now be described. The time modulation component, for example, can be defined as follows. Let $t_i$ be the time spacing between the $(i-1)^{th}$ pulse and the $i^{th}$ pulse. Accordingly, the total time to the $i^{th}$ pulse is $$T_i = \sum_{j=0}^{i} t_j.$$

The signal $T_i$ could be encoded for data, part of a spreading code or user code, or some combination thereof. For example, the signal $T_i$ could be equally spaced, or part of a spreading code, where $T_i$ corresponds to the zero-crossings of a chirp, i.e., the sequence of $T_i$'s, and where $$T_i = \sqrt{\frac{i-a}{k}}$$

for a predetermined set of a and k. Here, a and k may also be chosen from a finite set based on the user code or encoded data.

An embodiment of the present invention can be described using M-ary modulation. Equation 1 below can be used to represent a sequence of exemplary transmitted or received pulses, where each pulse is a shape modulated UWB wavelet, $g_{B_i}(t-T_i)$.

$$x(t) = \sum_{i=0}^{\infty} g_{B_i}(t - T_i) \tag{1}$$

In the above equation, the subscript i refers to the $i^{th}$ pulse in the sequence of UWB pulses transmitted or received. The wavelet function g has M possible shapes, and therefore $B_i$ represents a mapping from the data, to one of the M-ary modulation shapes at the $i^{th}$ pulse in the sequence. The wavelet generator hardware (e.g., the UWB waveform generator 17) has several control lines (e.g., coming from the radio controller and interface 9) that govern the shape of the wavelet. Therefore, $B_i$ can be thought of as including a lookup-table for the M combinations of control signals that produce the M desired wavelet shapes. The encoder 21 combines the data stream and codes to generate the M-ary states. Demodulation occurs in the waveform correlator 5 and the radio controller and interface 9 to recover to the original data stream. Time position and wavelet shape are combined into the pulse sequence to convey information, implement user codes, etc.

In the above case, the signal is comprised of wavelets from i=1 to infinity. As i is incremented, a wavelet is produced. Equation 2 below can be used to represent a generic wavelet pulse function, whose shape can be changed from pulse to pulse to convey information or implement user codes, etc.

$$g_{B_i}(t) = Re(B_{i,1}) \cdot f_{B_{i,2}, B_{i,3}, \ldots}(t) + Im(B_{i,1}) \cdot h_{B_{i,2}, B_{i,3}, \ldots}(t) \tag{2}$$

In the above equation, function f defines a basic wavelet shape, and function h is simply the Hilbert transform of the function f. The parameter $B_{i,1}$ is a complex number allowing the magnitude and phase of each wavelet pulse to be adjusted, i.e., $B_{i,1} = a_f \angle \theta_i$, where $a_f$ is selected from a finite set of amplitudes and $\theta_i$ is selected from a finite set of phases. The parameters $\{B_{i,2}, B_{i,3}, \ldots\}$ represent a generic group of parameters that control the wavelet shape.

An exemplary waveform sequence x(t) can be based on a family of wavelet pulse shapes f that are derivatives of a Guassian waveform as defined by Equation 3 below.

$$f_{B_i}(t) = \Psi(B_{i,2}, B_{i,3}) \left( \frac{d^{B_{i,3}}}{dt^{B_{i,3}}} e^{-[B_{i,2}t]^2} \right) \quad (3)$$

In the above equation, the function $\Psi(\ )$ normalizes the peak absolute value of $f_{B_i}(t)$ to 1. The parameter $B_{i,2}$ controls the pulse duration and center frequency. The parameter $B_{i,3}$ is the number of derivatives and controls the bandwidth and center frequency.

Another exemplary waveform sequence x(t) can be based on a family of wavelet pulse shapes f that are Gaussian weighted sinusoidal functions, as described by Equation 4 below.

$$f_{B_{i,2},B_{i,3},B_{i,4}} = f_{\omega_i, k_i, b_i}(t) = e^{-[b_i t]^2} \sin(\omega_i t + k_i t^2). \quad (4)$$

In the above equation, $b_i$ controls the pulse duration, $\omega_i$ controls the center frequency, and $k_i$ controls a chirp rate. Other exemplary weighting functions, beside Gaussian, that are also applicable to the present invention include, for example, Rectangular, Hanning, Hamming, Blackman-Harris, Nutall, Taylor, Kaiser, Chebychev, etc.

Another exemplary waveform sequence x(t) can be based on a family of wavelet pulse shapes f that are inverse-exponentially weighted sinusoidal functions, as described by Equation 5 below.

$$g_{B_i}(t) = \left( \frac{1}{e^{\frac{-(t-t1_i)}{3*tr_i}} + 1} - \frac{1}{e^{\frac{-(t-t2_i)}{3*tf_i}} + 1} \right) \cdot \sin(\theta_i + \omega_i t + k_i t^2) \quad (5)$$

where $\{B_{i,2}, B_{i,3}, B_{i,4}, B_{i,5}, B_{i,6}, B_{i,7}, B_{i,8}\} =$ $\{t1_i, t2_i, tr_i, tf_i, \theta_i, \omega_i, k_i\}$ In the above equation, the leading edge turn on time is controlled by t1, and the turn-on rate is controlled by tr. The trailing edge turn-off time is controlled by t2, and the turn-off rate is controlled by tf. Assuming the chirp starts at t=0 and $T_D$ is the pulse duration, the starting phase is controlled by $\theta$, the starting frequency is controlled by $\omega$, the chirp rate is controlled by k, and the stopping frequency is controlled by $\omega + kT_D$. An example assignment of parameter values is $\omega=1$, tr=tf=0.25, t1=tr/0.51, and t2=$T_D$-tr/9.

A feature of the present invention is that the M-ary parameter set used to control the wavelet shape is chosen so as to make a UWB signal, wherein the center frequency $f_c$ and the bandwidth B of the power spectrum of g(t) satisfies $2f_c > B > 0.25 f_c$. It should be noted that conventional equations define in-phase and quadrature signals (e.g., often referred to as I and Q) as sine and cosine terms. An important observation, however, is that this conventional definition is inadequate for UWB signals. The present invention recognizes that use of such conventional definition may lead to DC offset problems and inferior performance.

Furthermore, such inadequacies get progressively worse as the bandwidth moves away from $0.25 f_c$ and toward $2 f_c$. A key attribute of the exemplary wavelets (or e.g., those described in co-pending U.S. patent application Ser. No. 09/209,460) is that the parameters are chosen such that neither f nor h in Equation 2 above has a DC component, yet f and h exhibit the required wide relative bandwidth for UWB systems.

Similarly, as a result of $B > 0.25 f_c$, it should be noted that the matched filter output of the UWB signal is typically only a few cycles, or even a single cycle. For example, the parameter n in Equation 3 above may only take on low values (e.g., such as those described in co-pending U.S. patent application Ser. No. 09/209,460).

Figure 1B:
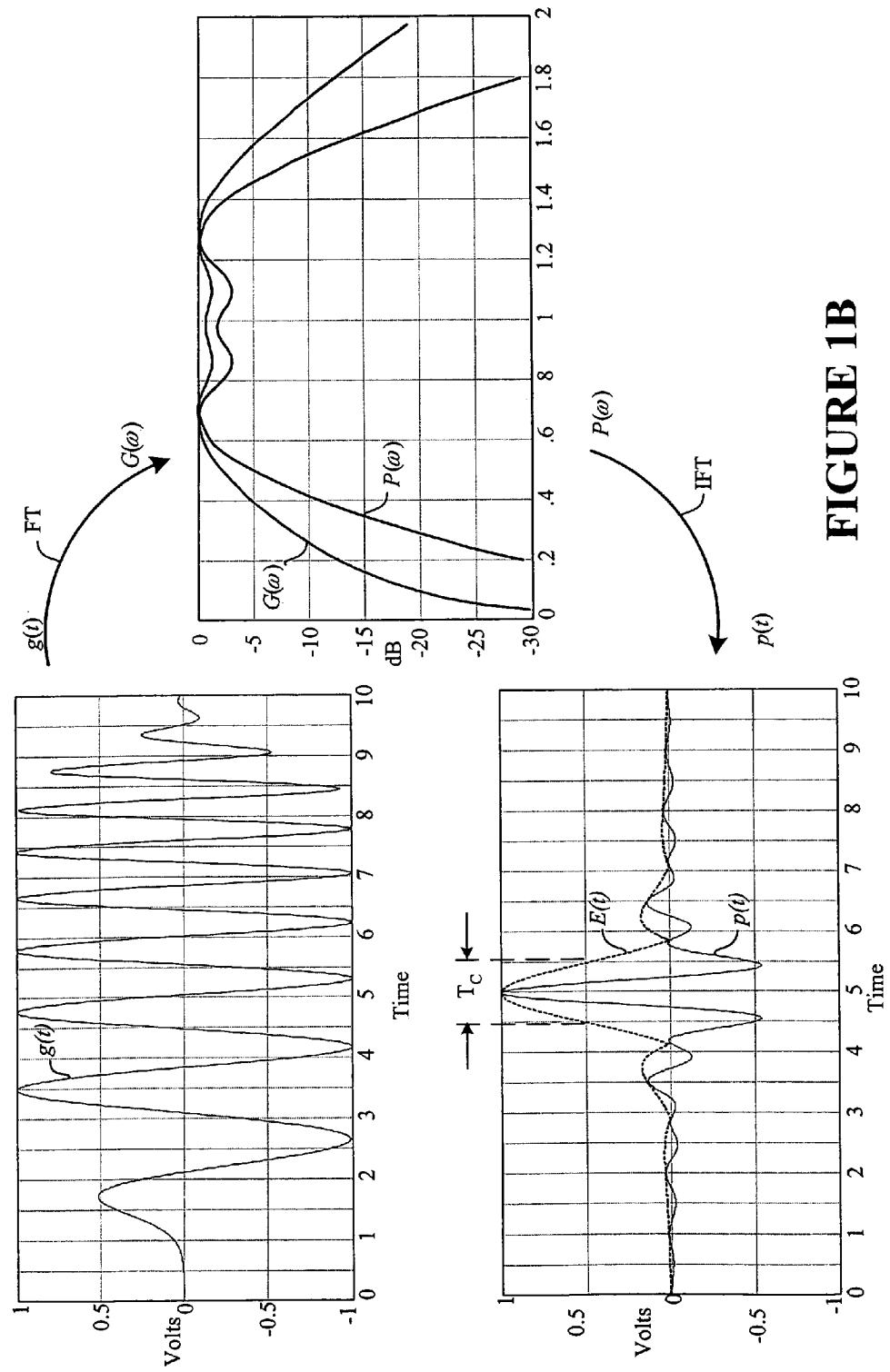
FIG. 1b is a diagram for illustrating the operation of the transceiver of FIG. 1a, according to the present invention.

The compressed (i.e., coherent matched filtered) pulse width of a UWB wavelet will now be defined with reference to FIG. 1b. In FIG. 1b, the time domain version of the wavelet thus represents g(t) and the Fourier transform (FT) version is represented by G($\omega$). Accordingly, the matched filter is represented as G*($\omega$), the complex conjugate, so that the output of the matched filter is P($\omega$)=G($\omega$)·G*($\omega$). The output of the matched filter in the time domain is seen by performing an inverse Fourier transform (IFT) on P($\omega$) so as to obtain p(t), the compressed or matched filtered pulse. The width of the compressed pulse p(t) is defined by $T_C$, which is the time between the points on the envelope of the compressed pulse E(t) that are 6 dB below the peak thereof, as shown in FIG. 1b. The envelope waveform E(t) may be determined by Equation 6 below.

$$E(t) = \sqrt{(p(t))^2 + (p^H(t))^2} \quad (6)$$

where $p^H(t)$ is the Hilbert transform of p(t).

Accordingly, the above-noted parameterized waveforms are examples of UWB wavelet functions that can be controlled to communicate information with a large parameter space for making codes with good resulting autocorrelation and cross-correlation functions. For digital modulation, each of the parameters is chosen from a predetermined list according to an encoder that receives the digital data to be communicated. For analog modulation, at least one parameter is changed dynamically according to some function (e.g., proportionally) of the analog signal that is to be communicated.

Referring back to FIG. 1a, the electrical signals coupled in through the antenna 1 are passed to a radio front end 3. Depending on the type of waveform, the radio front end 3 processes the electric signals so that the level of the signal and spectral components of the signal are suitable for processing in the UWB waveform correlator 5. The UWB waveform correlator 5 correlates the incoming signal (e.g., as modified by any spectral shaping, such as a matched filtering, partially matched filtering, simply roll-off, etc., accomplished in front end 3) with different candidate signals generated by the receiver 11, so as to determine when the receiver 11 is synchronized with the received signal and to determine the data that was transmitted.

The timing generator 7 of the receiver 11 operates under control of the radio controller and interface 9 to provide a clock signal that is used in the correlation process performed in the UWB waveform correlator 5. Moreover, in the receiver 11, the UWB waveform correlator 5 correlates in time a particular pulse sequence produced at the receiver 11 with the receive pulse sequence that was coupled in through antenna 1 and modified by front end 3. When the two such sequences are aligned with one another, the UWB waveform correlator 5 provides high signal to noise ratio (SNR) data to the radio controller and interface 9 for subsequent processing. In some circumstances, the output of the UWB waveform correlator 5 is the data itself. In other circumstances, the UWB waveform correlator 5 simply provides an intermediate correlation result, which the radio controller and interface 9 uses to determine the data and determine when the receiver 11 is synchronized with the incoming signal.

In some embodiments of the present invention, when synchronization is not achieved (e.g., during a signal acquisition mode of operation), the radio controller and interface 9 provides a control signal to the receiver 11 to acquire synchronization. In this way, a sliding of a correlation window within the UWB waveform correlator 5 is possible by adjustment of the phase and frequency of the output of the timing generator 7 of the receiver 11 via a control signal from the radio controller and interface 9. The control signal causes the correlation window to slide until lock is achieved. The radio controller and interface 9 is a processor-based unit that is implemented either with hard wired logic, such as in one or more application specific integrated circuits (ASICs) or in one or more programmable processors.

Once synchronized, the receiver 11 provides data to an input port ("RX Data In") of the radio controller and interface 9. An external process, via an output port ("RX Data Out") of the radio controller and interface 9, may then use this data. The external process may be any one of a number of processes performed with data that is either received via the receiver 11 or is to be transmitted via the transmitter 13 to a remote receiver.

During a transmit mode of operation, the radio controller and interface 9 receives source data at an input port ("TX Data In") from an external source. The radio controller and interface 9 then applies the data to an encoder 21 of the transmitter 13 via an output port ("TX Data Out"). In addition, the radio controller and interface 9 provides control signals to the transmitter 13 for use in identifying the signaling sequence of UWB pulses. In some embodiments of the present invention, the receiver 11 and the transmitter 13 functions may use joint resources, such as a common timing generator and/or a common antenna, for example. The encoder 21 receives user coding information and data from the radio controller and interface 9 and preprocesses the data and coding so as to provide a timing input for the UWB waveform generator 17, which produces UWB pulses encoded in shape and/or time to convey the data to a remote location.

The encoder 21 produces the control signals necessary to generate the required modulation. For example, the encoder 21 may take a serial bit stream and encode it with a forward error correction (FEC) algorithm (e.g., such as a Reed Solomon code, a Golay code, a Hamming code, a Convolutional code, etc.). The encoder 21 may also interleave the data to guard against burst errors. The encoder 21 may also apply a whitening function to prevent long strings of "ones" or "zeros." The encoder 21 may also apply a user specific spectrum spreading function, such as generating a predetermined length chipping code that is sent as a group to represent a bit (e.g., inverted for a "one" bit and non-inverted for a "zero" bit, etc.). The encoder 21 may divide the serial bit stream into subsets in order to send multiple bits per wavelet or per chipping code, and generate a plurality of control signals in order to affect any combination of the modulation schemes as described above (and/or as described in Lathi).

The radio controller and interface 9 may provide some identification, such as user ID, etc., of the source from which the data on the input port ("TX Data In") is received. In one embodiment of the present invention, this user ID may be inserted in the transmission sequence, as if it were a header of an information packet. In other embodiments of the present invention, the user ID itself may be employed to encode the data, such that a receiver receiving the transmission would need to postulate or have a priori knowledge of the user ID in order to make sense of the data. For example, the ID may be used to apply a different amplitude signal (e.g., of amplitude "f") to a fast modulation control signal to be discussed with respect to FIG. 2, as a way of impressing the encoding onto the signal.

The output from the encoder 21 is applied to a UWB waveform generator 17. The UWB waveform generator 17 produces a UWB pulse sequence of pulse shapes at pulse times according to the command signals it receives, which may be one of any number of different schemes. The output from the UWB generator 17 is then provided to an antenna 15, which then transmits the UWB energy to a receiver.

In one UWB modulation scheme, the data may be encoded by using the relative spacing of transmission pulses (e.g., PPM, chirp, etc.). In other UWB modulation schemes, the data may be encoded by exploiting the shape of the pulses as described above (and/or as described in Lathi). It should be noted that the present invention is able to combine time modulation (e.g., such as pulse position modulation, chirp, etc.) with other modulation schemes that manipulate the shape of the pulses.

There are numerous advantages to the above capability, such as communicating more than one data bit per symbol transmitted from the transmitter 13, etc. An often even more important quality, however, is the application of such technique to implement spread-spectrum, multi-user systems, which require multiple spreading codes (e.g., such as each with spike autocorrelation functions, and jointly with low peak cross-correlation functions, etc.).

In addition, combining timing, phase, frequency, and amplitude modulation adds extra degrees of freedom to the spreading code functions, allowing greater optimization of the cross-correlation and autocorrelation characteristics. As a result of the improved autocorrelation and cross-correlation characteristics, the system according to the present invention has improved capability, allowing many transceiver units to operate in close proximity without suffering from interference from one another.

Figure 2:
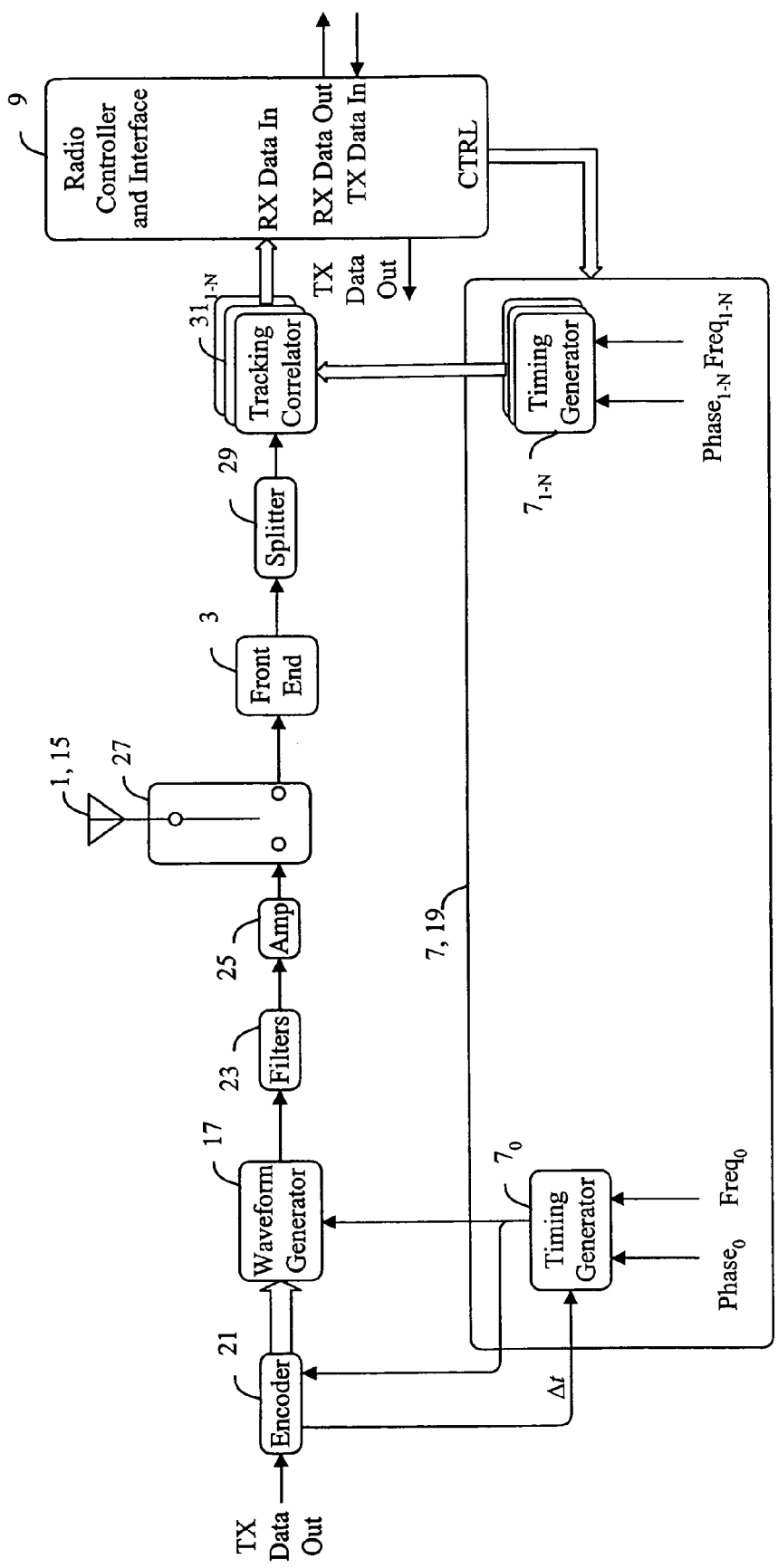
FIG. 2 is a block diagram of the transceiver of FIG. 1a, that manipulates a shape of UWB pulses, according to the present invention.

FIG. 2 is a block diagram of a transceiver embodiment of the present invention in which the modulation scheme employed is able to manipulate the shape and time of the UWB pulses. In FIG. 2, when receiving energy through the antenna 1, 15 (e.g., corresponding antennas 1 and 15 of FIG. 1a) the energy is coupled in to a transmit/receive (T/R) switch 27, which passes the energy to a radio front end 3. The radio front end 3 filters, extracts noise, and adjusts the amplitude of the signal before providing the same to a splitter 29. The splitter 29 divides the signal up into one of N different signals and applies the N different signals to different tracking correlators $31_1$-$31_N$. Each of the tracking correlators $31_1$-$31_N$ receives a clock input signal from a respective timing generator $7_1$-$7_N$ of a timing generator module 7, 19, as shown in FIG. 2.

The timing generators $7_1$-$7_N$, for example, receive a phase and frequency adjustment signal, as shown in FIG. 2, but may also receive a fast modulation signal or other control signal(s) as well. The radio controller and interface 9 provides the control signals, such as phase, frequency and fast modulation signals, etc., to the timing generator module 7, 19, for time synchronization and modulation control. The fast modulation control signal may be used to implement, for example, chirp waveforms, PPM waveforms, such as fast time scale PPM waveforms, etc.

The radio controller and interface 9 also provides control signals to, for example, the encoder 21, the waveform generator 17, the filters 23, the amplifier 25, the T/R switch 27, the front end 3, the tracking correlators $31_1$-$31_N$ (corresponding to the UWB waveform correlator 5 of FIG. 1a), etc., for controlling, for example, amplifier gains, signal waveforms, filter passbands and notch functions, alternative demodulation and detecting processes, user codes, spreading codes, cover codes, etc.

During signal acquisition, the radio controller and interface 9 adjusts the phase input of, for example, the timing generator $7_1$, in an attempt for the tracking correlator $31_1$ to identify and the match the timing of the signal produced at the receiver with the timing of the arriving signal. When the received signal and the locally generated signal coincide in time with one another, the radio controller and interface 9 senses the high signal strength or high SNR and begins to track, so that the receiver is synchronized with the received signal.

Once synchronized, the receiver will operate in a tracking mode, where the timing generator $7_1$ is adjusted by way of a continuing series of phase adjustments to counteract any differences in timing of the timing generator $7_1$ and the incoming signal. However, a feature of the present invention is that by sensing the mean of the phase adjustments over a known period of time, the radio controller and interface 9 adjusts the frequency of the timing generator $7_1$ so that the mean of the phase adjustments becomes zero. The frequency is adjusted in this instance because it is clear from the pattern of phase adjustments that there is a frequency offset between the timing generator $7_1$ and the clocking of the received signal. Similar operations may be performed on timing generators $7_2$-$7_N$, so that each receiver can recover the signal delayed by different amounts, such as the delays caused by multipath (i.e., scattering along different paths via reflecting off of local objects).

A feature of the transceiver in FIG. 2 is that it includes a plurality of tracking correlators $31_1$-$31_N$. By providing a plurality of tracking correlators, several advantages are obtained. First, it is possible to achieve synchronization more quickly (i.e., by operating parallel sets of correlation arms to find strong SNR points over different code-wheel segments). Second, during a receive mode of operation, the multiple arms can resolve and lock onto different multipath components of a signal. Through coherent addition, the UWB communication system uses the energy from the different multipath signal components to reinforce the received signal, thereby improving signal to noise ratio. Third, by providing a plurality of tracking correlator arms, it is also possible to use one arm to continuously scan the channel for a better signal than is being received on other arms.

In one embodiment of the present invention, if and when the scanning arm finds a multipath term with higher SNR than another arm that is being used to demodulate data, the role of the arms is switched (i.e., the arm with the higher SNR is used to demodulate data, while the arm with the lower SNR begins searching). In this way, the communications system dynamically adapts to changing channel conditions.

The radio controller and interface 9 receives the information from the different tracking correlators $31_1$-$31_N$ and decodes the data. The radio controller and interface 9 also provides control signals for controlling the front end 3, e.g., such as gain, filter selection, filter adaptation, etc., and adjusting the synchronization and tracking operations by way of the timing generator module 7, 19.

In addition, the radio controller and interface 9 serves as an interface between the communication link feature of the present invention and other higher level applications that will use the wireless UWB communication link for performing other functions. Some of these functions would include, for example, performing range-finding operations, wireless telephony, file sharing, personal digital assistant (PDA) functions, embedded control functions, location-finding operations, etc.

On the transmit portion of the transceiver shown in FIG. 2, a timing generator $7_0$ also receives phase, frequency and/or fast modulation adjustment signals for use in encoding a UWB waveform from the radio controller and interface 9. Data and user codes (via a control signal) are provided to the encoder 21, which in the case of an embodiment of the present invention utilizing time-modulation, passes command signals (e.g., $\Delta t$) to the timing generator $7_0$ for providing the time at which to send a pulse. In this way, encoding of the data into the transmitted waveform may be performed.

When the shape of the different pulses are modulated according to the data and/or codes, the encoder 21 produces the command signals as a way to select different shapes for generating particular waveforms in the waveform generator 17. For example, the data may be grouped in multiple data bits per channel symbol. The waveform generator 17 then produces the requested waveform at a particular time as indicated by the timing generator $7_0$. The output of the waveform generator is then filtered in filter 23 and amplified in amplifier 25 before being transmitted via antenna 1, 15 by way of the T/R switch 27.

In another embodiment of the present invention, the transmit power is set low enough that the transmitter and receiver are simply alternately powered down without need for the T/R switch 27. Also, in some embodiments of the present invention, neither the filter 23 nor the amplifier 25 is needed, because the desired power level and spectrum is directly useable from the waveform generator 17. In addition, the filters 23 and the amplifier 25 may be included in the waveform generator 17 depending on the implementation of the present invention.

A feature of the UWB communications system disclosed, is that the transmitted waveform x(t) can be made to have a nearly continuous power flow, for example, by using a high chipping rate, where the wavelets g(t) are placed nearly back-to-back. This configuration allows the system to operate at low peak voltages, yet produce ample average transmit power to operate effectively. As a result, sub-micron geometry CMOS switches, for example, running at one-volt levels, can be used to directly drive antenna 1, 15, such that the amplifier 25 is not required. In this way, the entire radio can be integrated on a single monolithic integrated circuit.

Under certain operating conditions, the system can be operated without the filters 23. If, however, the system is to be operated, for example, with another radio system, the filters 23 can be used to provide a notch function to limit interference with other radio systems. In this way, the system can operate simultaneously with other radio systems, providing advantages over conventional devices that use avalanching type devices connected straight to an antenna, such that it is difficult to include filters therein.

Figure 3:
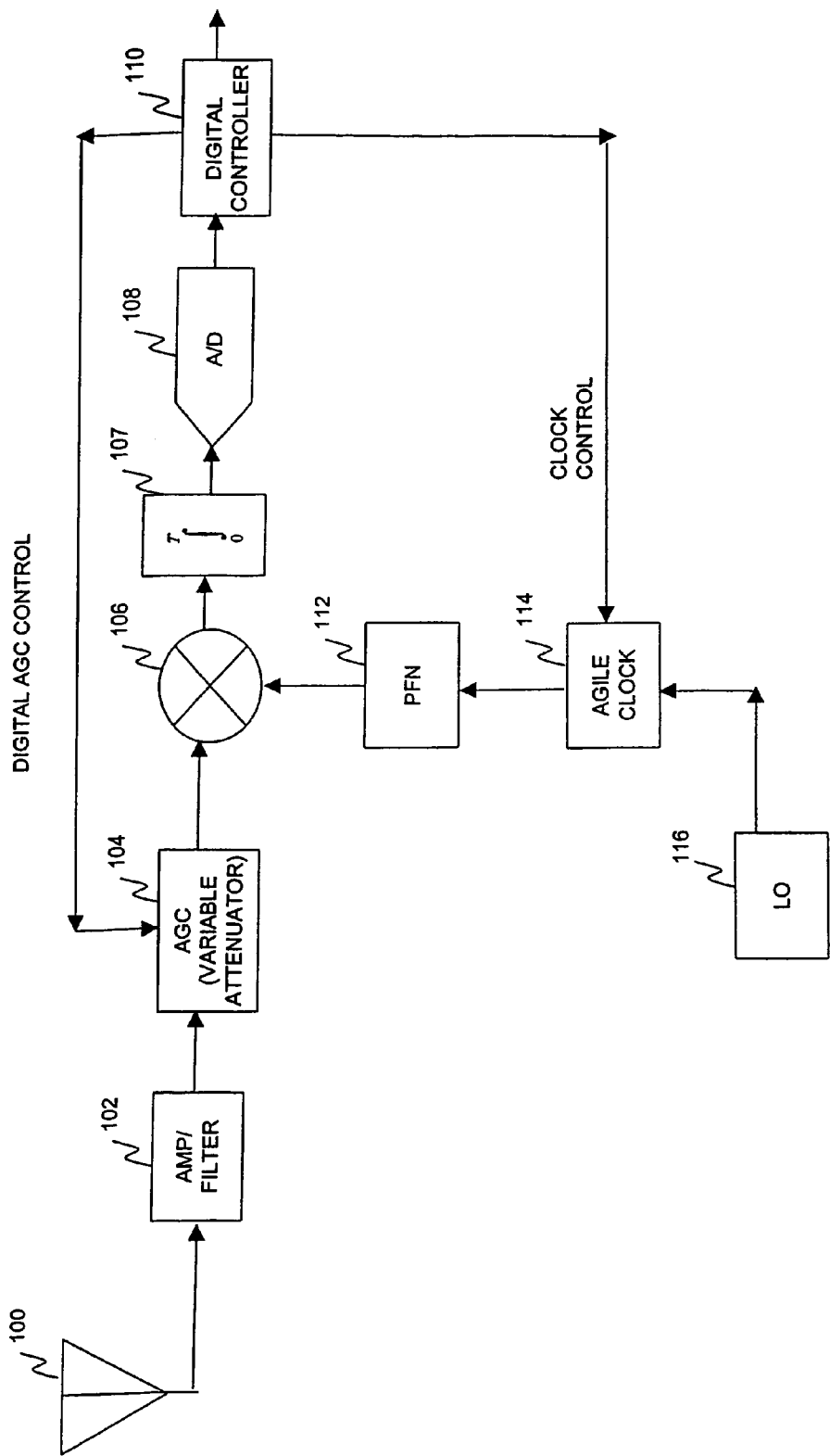
FIG. 3 is a block diagram of an exemplary UWB receiver of the present invention.

FIG. 3 is a block diagram of an exemplary UWB receiver according to the present invention. As compared with FIG. 2, only one tracking correlator arm is shown in FIG. 3 so as to simplify the discussion, however, it should be appreciated that the invention may be practiced with multiple tracking correlators, as shown in FIG. 2. In this example, amplifier 102 is disposed in the front end 3 of FIG. 1, mixer 106, integrator 107, and PFN 112 are disposed in UWB waveform correlator 5 of FIG. 1, timing logic 116 and timing generator 114 are disposed in the timing generator 7 of FIG. 1, and A to D converter 108 and digital controller 110 may be included in radio controller and interface 9 of FIG. 1. In an exemplary UWB receiver of the present invention, an electromagnetic signal is transmitted over a radio channel to be received in the UWB receiver at antenna 100. After passing through antenna 100 and being converted into an electrical signal, the signal is amplified at amplifier 102. The incoming signal is then normalized to fall within a particular dynamic range via AGC (automatic gain control, such as a variable attenuator) 104 to produce an acceptable signal level. At pulse forming network (PFN) 112, a series of local pulses (e.g., square pulses or perhaps wavelets) are generated and multiplied with the incoming signal at mixer 106. Thus, PFN 112 can be formed from a wavelet generator. Integrator 107 accumulates the mixer output over a predetermined period. The output is sampled at A/D converter 108 at a rate that corresponds to a source bit rate, such that there are a predetermined number of samples per bit, such as one sample per bit. The output of A/D converter 108 is provided to digital controller 110, where synchronization mode control is performed. The digital controller sends a control signal back to timing generator 114 as part of the synchronization process. The timing generator 114 uses an internal local oscillator to adjust the phase of the local pulse mixed with the incoming signal in mixer 106. PFN 112 sends a reset command to integrator 107 for each bit (if that is the selected accumulate period). Timing logic block 116 sends a clock command to A/D converter 108 to sample the output of integrator 107. Digital controller 110 monitors the strength of the signal from A/D converter 108 and sends instructions to AGC 104 to adjust the gain.

A mode controller in digital controller 110 determines if the receiver should be in acquisition or tracking mode based on the signal-to-noise ratio (SNR). Digital controller 110 sends a clock control signal back to the timing generator 114 as part of the synchronization process. If the SNR is less than a predetermined amount, the control signal adjusts the phase and/or frequency of the timing generator in an attempt to synchronize to, or accurately track the received signal. If the output signal quality from integrator 107 is consistently below a predetermined threshold, the mode controller places the system into acquisition mode, and digital controller 110 sends a signal to timing generator 114 to adjust the phase of the generated local pulse stream. The local pulse stream slides in phase until it is aligned in time with the incoming signal at mixer 106, hence, obtaining maximum correlation magnitude. The point at which maximum correlation occurs is determined by any of a variety of acquisition routines, as will be discussed. The timing generator 114 provides a timing signal to the PFN 112 that produces a locally generated pulse stream that is mixed with the incoming signal at mixer 106.

Figure 4A:
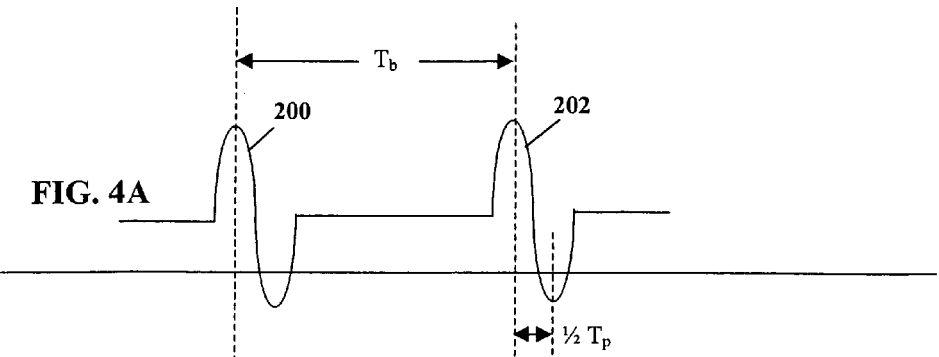
FIGS. 4A-C show a signal flow diagram of an incoming signal, a local pulse created at the receiver, and the correlation function of the incoming signal and the local pulse according to one embodiment of the present invention.
Figure 4B:
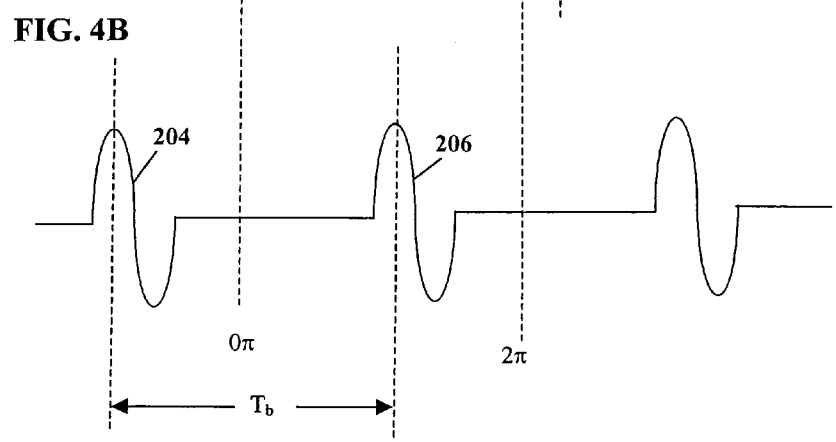
Figure 4C:
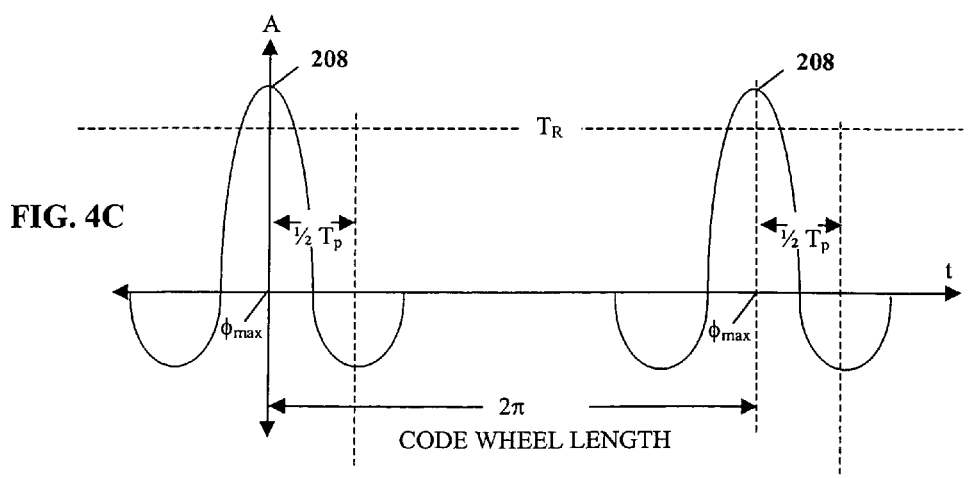

FIGS. 4A-4C show the signal flow diagram of the incoming signal, the local pulses created by PFN 112, and the resulting correlation function of the incoming signal with the local pulse according to the present invention. In FIG. 4A, incoming pulses 200 and 202 arrive at some fixed clock interval called $T_b$. $T_b$ is 10 nanoseconds, for example. In FIG. 4B, the locally generated pulses 204 and 206 are similar to the incoming pulses. There is maximum correlation at integrator 107 when the two signals are perfectly phase aligned. Initially, it is not known whether the two signals are aligned (synchronized) with each other. Thus, the local pulses created in PFN 112 may be positioned between the pulses of the incoming signal as shown in FIGS. 4A and 4B. As a result, the magnitude of the output of integrator 107 is small. In other words, the signals have a small correlation result. So, in order to maximize correlation, the phase of timing generator 114 attached to PFN 112 is varied under control of the digital controller 110 until locally generated pulses are in phase with the incoming signal at mixer 106. If the output from integrator 107 is not maximized, then digital controller 110 sends a signal to timing generator 114 to adjust the phase of the locally generated pulses. As such, the local pulses slide in phase until they are aligned (synchronized) with the incoming pulse train at mixer 106 and hence maximum correlation is achieved.

FIG. 4C shows the correlation result of the incoming signal with the locally generated pulses as a function of time (or phase, since the phase is scanned), as well as an illustrative exemplary magnitude threshold TR that can be used to identify specific portions of the correlation function. Note, for clarity of illustration, it is assumed in FIG. 4C that the incoming data stream consists of all ones. Bi-phase modulated data would not affect the discussion. As can be seen at point 208, when the signals are perfectly phase aligned, the correlation is at a maximum. Furthermore, point 208 along with neighboring portions of the correlation is above exemplary magnitude threshold $T_R$. Essentially, the correlation function is examined over a given time (or phase) until the portions of the correlation above the exemplary magnitude threshold $T_R$ are found. At phases where the correlation is above exemplary magnitude threshold $T_R$, the receiver can be considered synchronized to the incoming signal.

Figure 5:
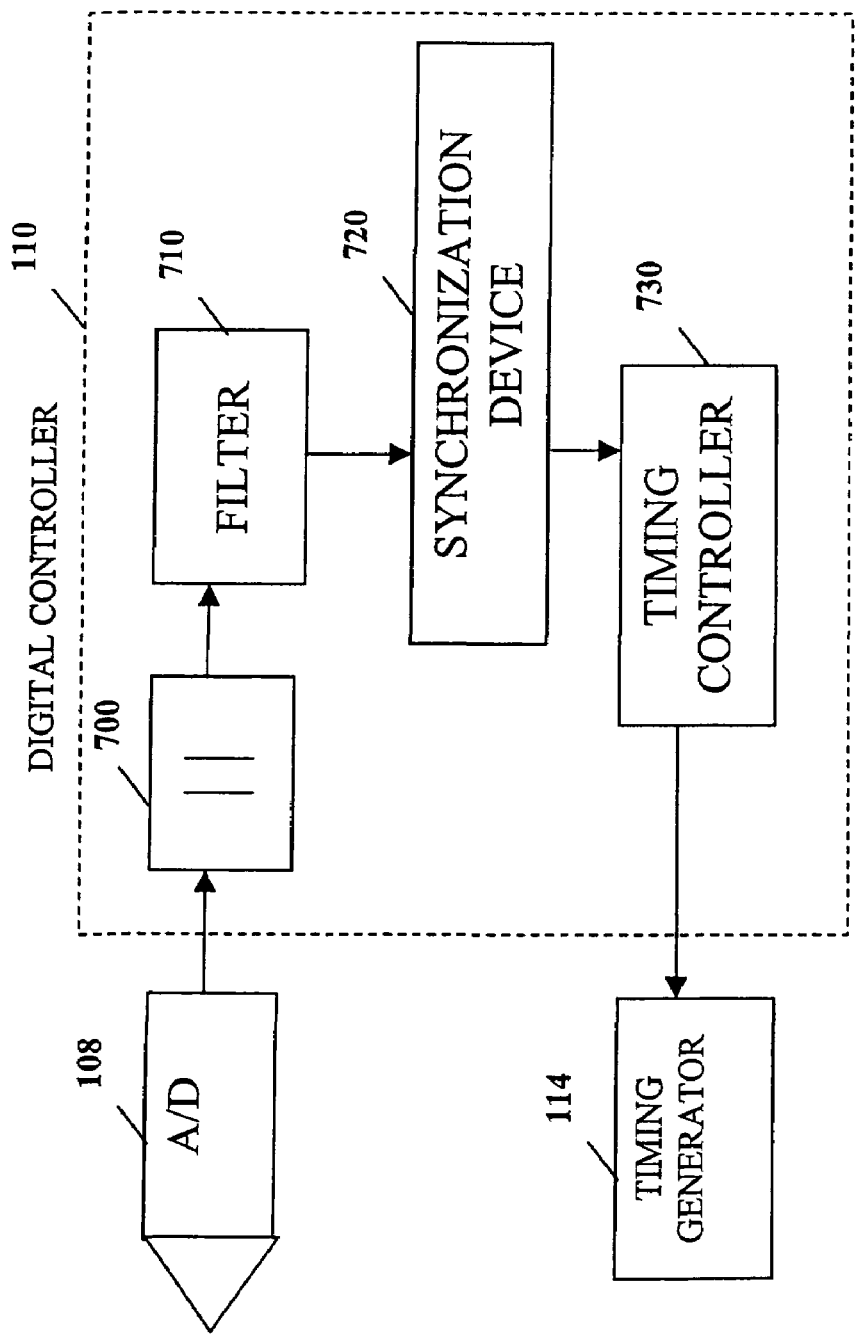
FIG. 5 illustrates the processing blocks employed within digital controller 110 of a receiver to acquire synchronization with the received pulse stream.

FIG. 5 shows the processing blocks employed within digital controller 110 of a receiver to acquire synchronization with the received pulse stream. The incoming samples from the A/D converter 108 in FIG. 3 are passed to absolute value block 700 in digital controller 110. The absolute value block computes the absolute value of the input sample and passes the new value to filter block 710. Filter block 710 filters the incoming sequence of absolute values as a method of reducing noise. This filter could be any one a number of digital filters employed for these purposes, including but not limited to: all-pass filters, integrators, leaky integrators, box-car filters, other lowpass or bandpass finite impulse response filters, or lowpass or bandpass infinite impulse response filters. A complete description of these and other digital filters is given by Openheim and Shafer in Digital Signal Processing , the entire contents of which are incorporated herein by reference. The output of filter block 710 will be referred to as correlation value K. Correlation value K is passed into the synchronization processor block 720. The contents of synchronization processor block 720 are discussed below. Based upon information from synchronization processor block 720, timing controller block 730 sends commands out of the digital controller 110 to the timing generator 114.

The code wheel is a representation of the user code with which the incoming data is coded. The code wheel can be visualized as a circular device containing the chips that make up the user code, where each chip is distributed at a fixed interval relative to its nearest neighbor around the code wheel from 0 to $2\pi$. Then, the interval between each chip is $2\pi/n$, where n is the number of chips in the code. One "rotation" of the code wheel, $2\pi$, is equivalent to the bit period $T_b$. So, through a "rotation," the phase of the local pulses from PFN 112 is adjusted such that the entire correlation function is generated. As such, when the incoming pulses are aligned with the locally generated pulses, a code wheel turn through one chip in the code ($2\pi/n$) is identical to a phase shift between adjacent pulses of the incoming signal. Methods of moving the phase of the locally generated pulses relative to the received pulse train is the subject of the patent application entitled A LOW POWER, HIGH RESOLUTION TIMING GENERATOR FOR ULTRA-WIDE BANDWIDTH COM- MUNICATION SYSTEMS application Ser. No. 09/685,199, filed Oct. 10, 2000, the entire contents of which are incorporated herein by reference.

Figure 6A:
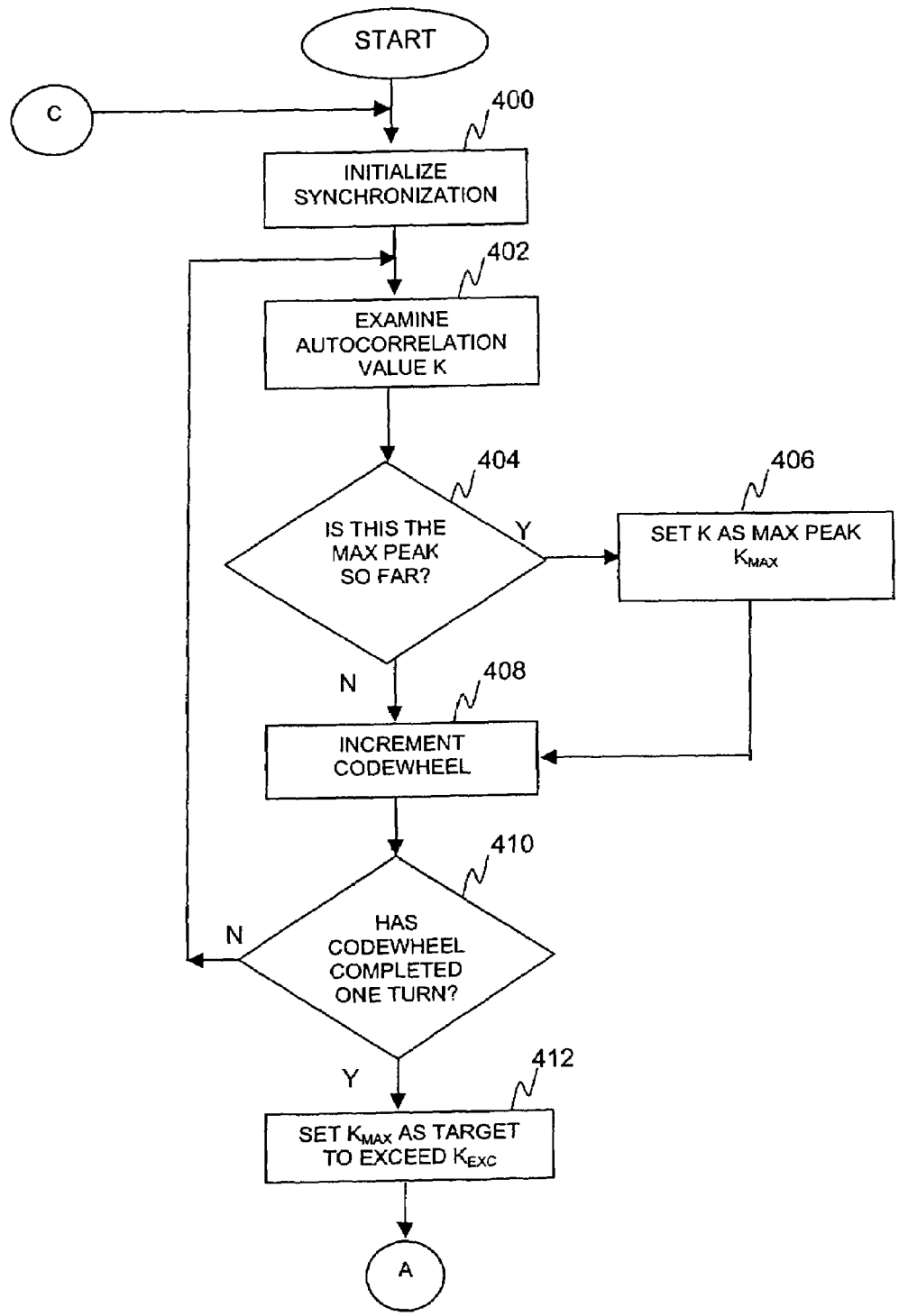
FIG. 6 is a flow chart outlining an exemplary process flow performed in a synchronization processor according to one embodiment of the present invention.
Figure 6B:
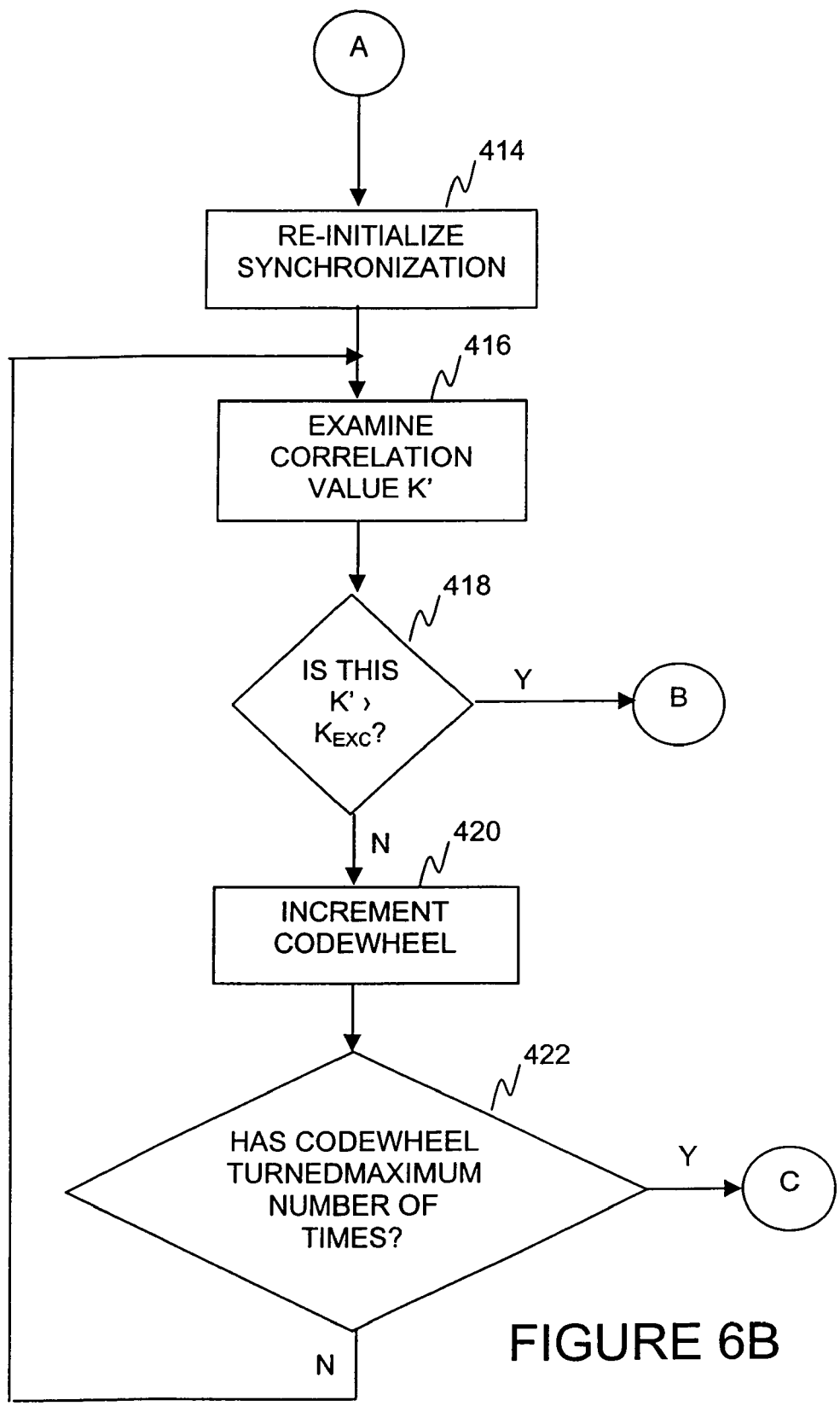
Figure 6C:
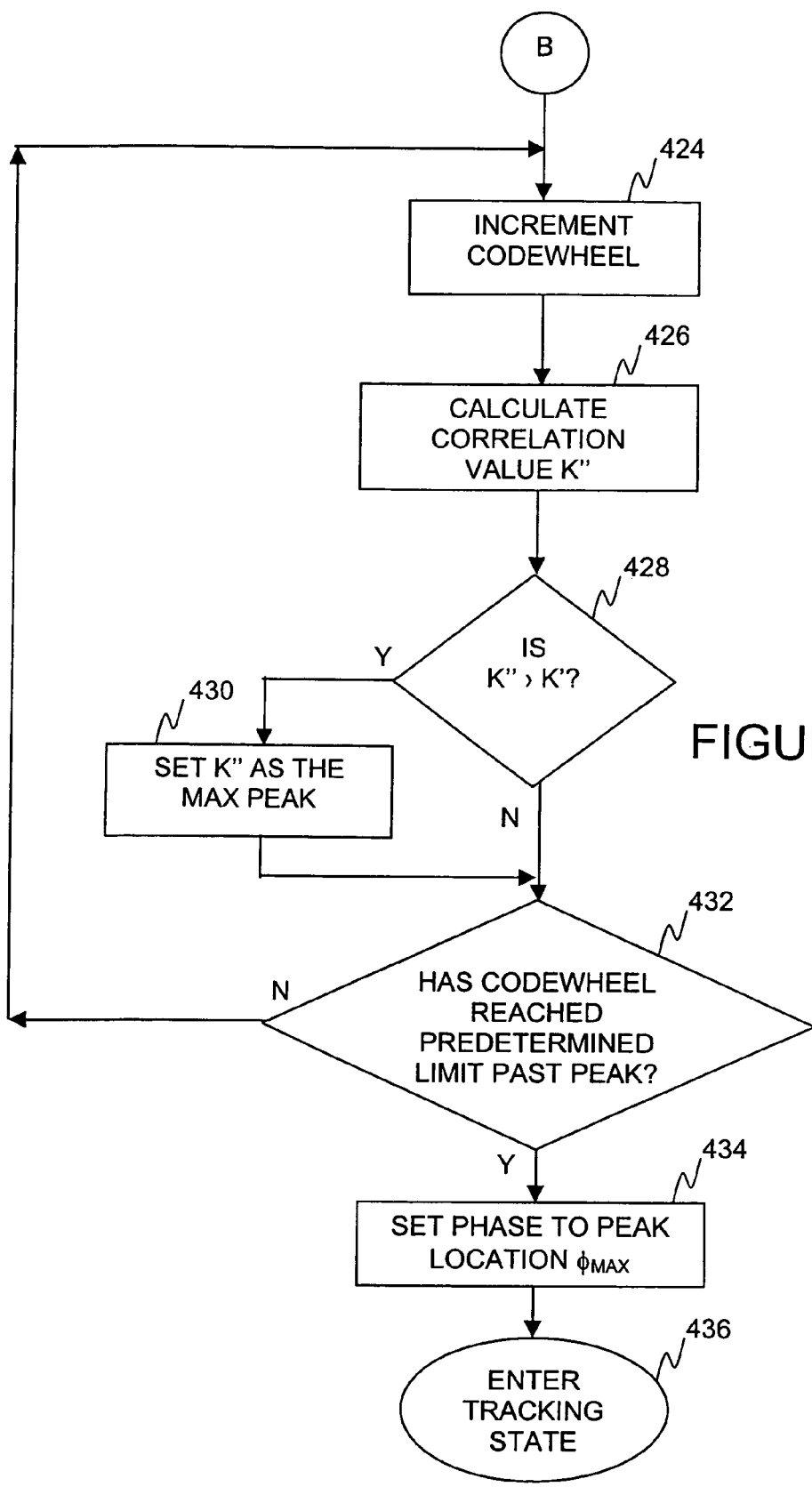

Note that due to code sidelobes and multipath signals, there may be many phases at which synchronization is possible. Since in the current embodiment of the invention, only the best synchronization phase is sought, all possible phases must be examined. Thus, the code wheel must complete at least one rotation. FIG. 6 is a flow chart outlining the steps performed in synchronization processor block 720 of FIG. 5 to achieve fast synchronization in the current embodiment of the invention.

In FIG. 6, the code wheel is initially set to zero phase, i.e. no phase adjustment and the maximum correlation value $K_{max}$ is set to 0 in step 400. A correlation value K of the incoming signal with the generated local pulses at PFN 112 is examined in step 402. In step 404, an inquiry is made whether the correlation value K is the maximum thus far encountered. If K is the maximum correlation value, then K becomes the new maximum correlation value $K_{max}$ in step 406. If, however, the correlation value K is not the maximum so far, then the search continues, and the code wheel is incremented by an amount considerably less than a chip interval (i.e. the phase is adjusted) in step 408. In step 410, an inquiry is made whether the code wheel has completed a full rotation. If the code wheel has not, then steps 402-410 are repeated to find the maximum correlation value. If the code wheel has completed a full rotation, then in step 412, $K_{max}$ is the maximum correlation value found from one full rotation of the code wheel. $K_{max}$ is set as the target to exceed, $K_{exc}$. This ends the first mode of fast synchronization.

In step 414, the code wheel is re-initialized to zero phase, i.e. no phase adjustment. In step 416, a correlation value K' is examined. K' is compared to $K_{exc}$, in step 418. If K' is less than $K_{exc}$, then the code wheel is incremented in step 420. In step 422, an inquiry is made as to whether the number of code wheel turns has reached the predetermined maximum, for example 5 turns. If it has, then the receiver resets and returns to step 400. Otherwise, steps 416 through 422 are repeated until either K' exceeds $K_{exc}$ or the number of code wheel rotations reaches the predetermined maximum. In step 418, if K' exceeds $K_{exc}$, then K' is the new maximum. This ends the second mode of fast synchronization.

In the third mode of fast synchronization, minor phase adjustments are made around the phase corresponding to correlation value K' to ensure that the correlation maximum, and not a sidelobe or off-peak value, has been found. So, in step 424, the code wheel is incremented. Here, synchronization processor block 720 in FIG. 5 can instruct timing controller block 730 to reduce the size of the phase steps in order to increase resolution and ensure that the maximum peak is found within the desired precision. Then, in step 426, correlation value K" is examined. In step 428, an inquiry is made whether K" exceeds K'. If so, K" is set to the new maximum peak in step 430. This means that the phase adjustment to the local pulse corresponds to the correlation value K". In step 432, an inquiry is made whether the code wheel has reached a predetermined limit past the peak correlation. If not, steps 424 through 432 are repeated. Otherwise, in step 434, the local operating phase is set to the phase at which the peak correlation occurred. The incoming signal is now synchronized to the receiver, and in step 436, the receiver is placed into the tracking mode of synchronization.

Figure 7:
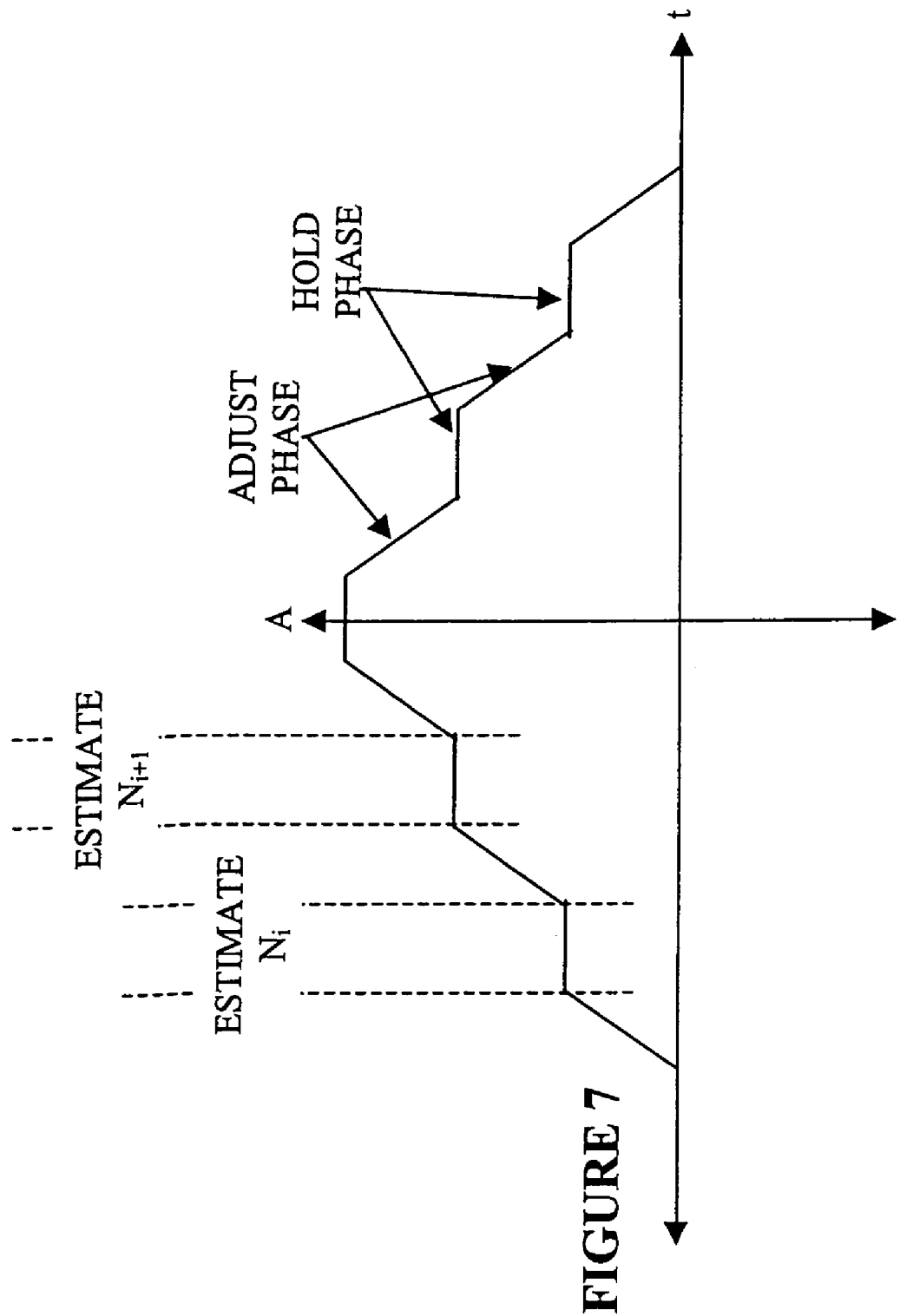
FIG. 7 is an exemplary correlation function derived by sweeping the phase for a period of time and then holding the phase constant for a period of time.

The values of the course and fine phase steps employed in FIG. 6 depend upon the width and shape of the correlation function. For example, if the signaling waveform is a Gaussian monocycle with a 350 pico-second peak-to-peak pulse width, then the course phase step size could be 48 picoseconds and the fine step size could be 12 pico-seconds. During a code wheel turn, the phase of the local pulse train is scanned from 0 to $2\pi$. The method of scanning the phase can have various embodiments. In FIG. 7, the magnitude of an exemplary correlation result is presented as a function of time (and phase, since phase is scanned), where the phase of the locally generated pulse train is repeatedly changed relative to the input pulse sequence for a period of time and then held constant for a period of time. The plateaus indicate time periods when the phase is held constant. Of course this is a hypothetical example in which there is no noticeable frequency drift between the transmitter and receiver. The sloped portions of the curve indicate time periods over which the phase is changing. During periods of constant phase, statistics such as mean absolute correlation value and noise variance can be calculated as a method of determining if the local pulse train is locked to the incoming signal at the present phase. As illustrated, the maximum of the curve occurs on the highest plateau, although this is not necessarily the case in all scans. Furthermore, the curve appears to increase linearly between plateaus. This, too, is for illustrative purposes only. The scan and hold process can be repeated over the entire rotation of the code wheel from 0 to $2\pi$ radians (not shown), or it can be performed over a limited phase range for sub-code wheel spins. Although FIG. 7 illustrates a piecewise continuous scan through the correlation function, the correlation function is computed only at discreet phases.

Figure 8:
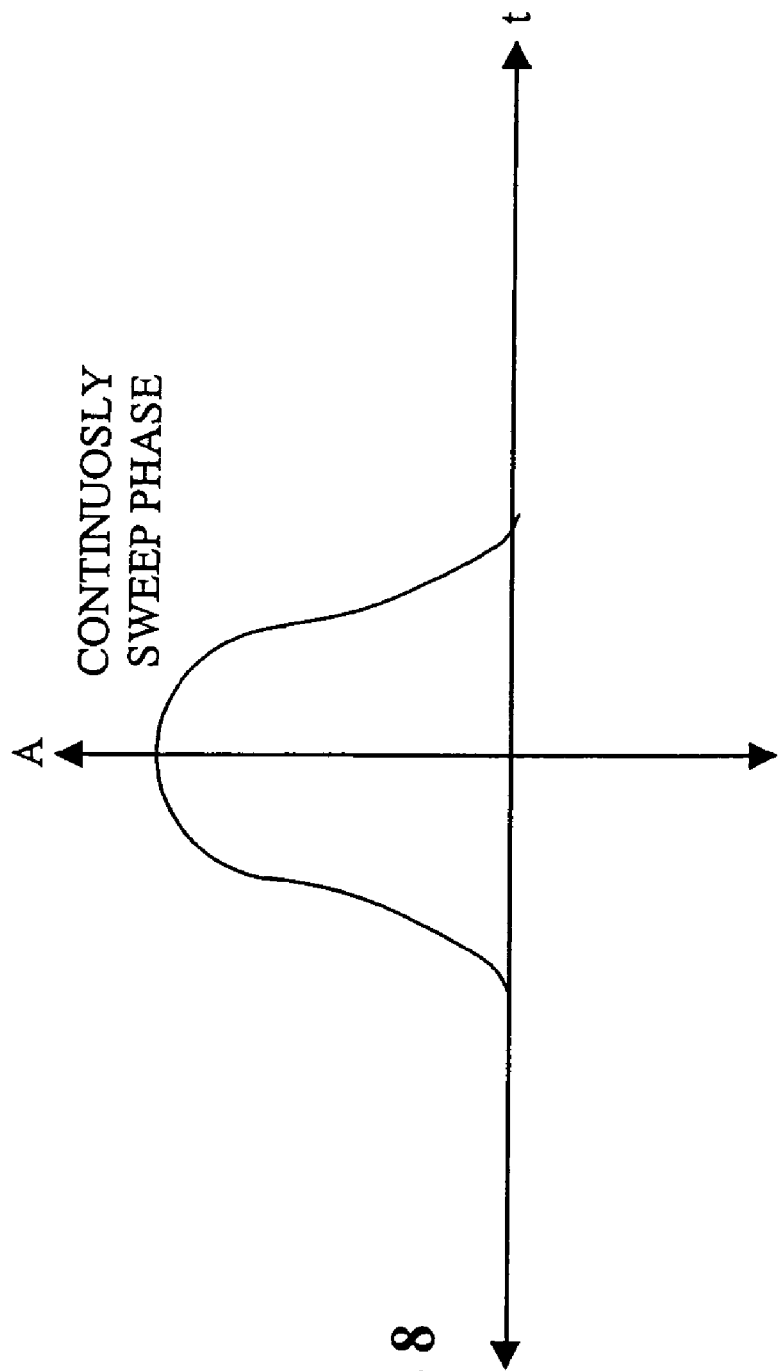
FIG. 8 illustrates the magnitude of an exemplary correlation result is presented as a function of time, where the phase of the locally generated pulse train is repeatedly changed relative to the input pulse sequence over a complete phase range or a limited phase range for sub-code wheel spins.

In FIG. 8, the magnitude of an exemplary correlation result is presented as a function of time (and phase, since phase is scanned), where the phase of the locally generated pulse train is repeatedly changed relative to the input pulse sequence over a complete phase range (from zero to $2\pi$ radians) or a limited (<$2\pi$ radians) phase range for sub-code wheel spins. The correlation result displayed in FIG. 8 is an abbreviated version of the complete phase range correlation illustrated in FIG. 4C. For example, the negative portions of the correlation in FIG. 4C are omitted since they lie outside the scan range. Although FIG. 8 illustrates a continuous scan through the correlation function, the correlation function is computed only at discreet phases.

Figure 9A:
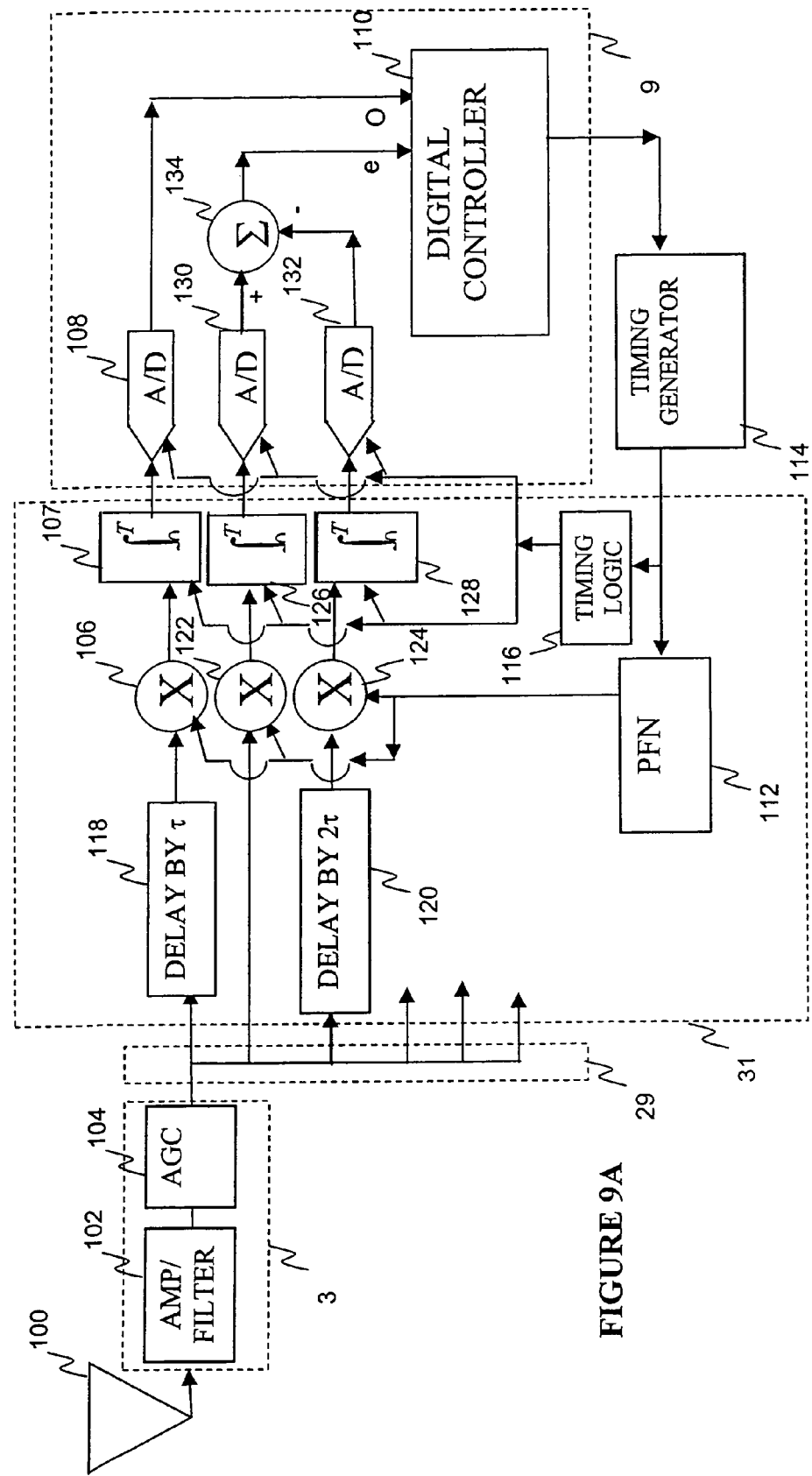
FIGS. 9A-B are block diagrams of two exemplary UWB receivers employing a phase error term for tracking through use of a delay lock loop.

After the initial acquisition of the received signal phase, the phase of the incoming signal must be tracked to ensure that synchronization in maintained. Decisions about transitioning between tracking and acquisition states are made by a mode controller. FIG. 9A shows a block diagram of a system employed for the purposes of tracking the phase of the incoming signal. This block diagram is similar to FIG. 3, except for the addition of delay blocks 118 and 120, mixers 122 and 124, integrators 126 and 128, A/D converters 130 and 132, and summer 134. A transmitted electromagnetic signal arrives at antenna 100 and is converter to an electrical signal that is processed by amplifier/filter 102 and AGC 104. Then, the signal is split into three paths. The "main" path is delayed by an amount of time $\tau$, for example 75 pico-seconds. The "lead" path is not delayed. And the "lag" path is delayed by an amount of time $2\tau$. All three paths proceed through mixers, integrators, and A/D converters as presented in the description of FIG. 3. The signals from the lead and lag paths arrive at summer 134 from A/D converters 130 and 132, respectively. At summer 134, a difference between these two signals is computed. Although FIG. 9A shows the lag signal being subtracted from the lead signal, the implementation could actually subtract the lead signal from the lag signal. The result is an error signal e that is passed to digital controller block 110.

Figure 9B:
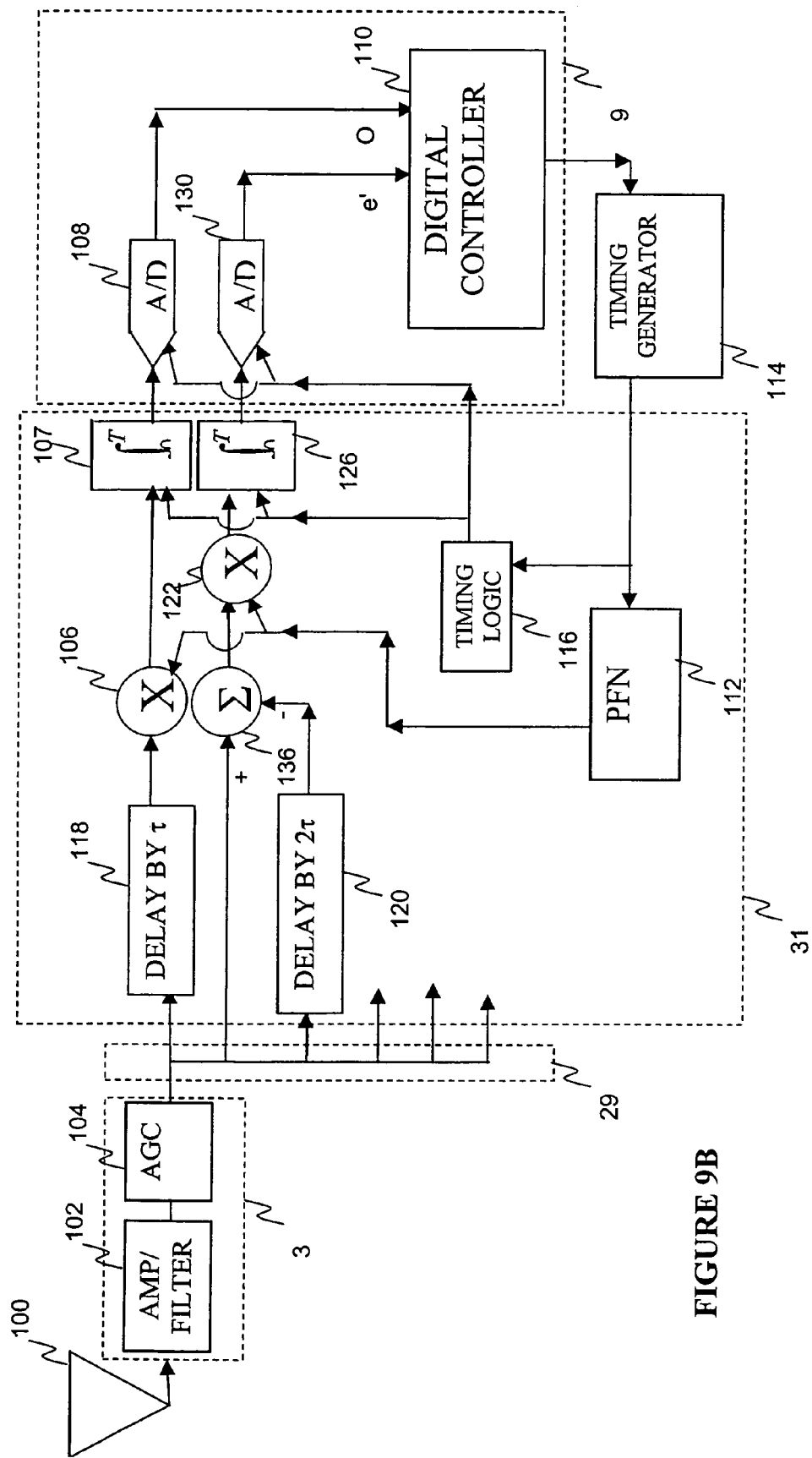

FIG. 9B is another embodiment of a tracking control system. It is similar to FIG. 9A except mixer 124, integrator 128, A/D converter 132, and summer 134 have been removed, and summer 136 has been added. In FIG. 9B, the lead and lag paths both enter summer 136 immediately following AGC 104. Summer 136 takes the analog difference between these two signals. Again, FIG. 9B shows the lag term subtracted from the lead term, but it could be the other way around. The difference signal is passed to mixer 122 where it is multiplied by a locally generated pulse train from PFN 112. The result is integrated by integrator 126, and sampled by A/D converter 130. The resulting error signal e' is passed to digital controller block 110.

If we allow the vector $\bar{x}_0$ to represent the lead signal and the vector $\bar{x}_2$ to represent the lag signal, then e in FIG. 9A is given by $e=\bar{x}_0^T\bar{y}-\bar{x}_2^T\bar{y}$, where y represents the locally generated pulse stream and superscript T indicates transpose. The combination of mixers, integrators, and A/D converters perform an inner product. From FIG. 9B, $$e'=(\bar{x}_0-\bar{x}_2)^T\bar{y}=\bar{x}_0^T\bar{y}-\bar{x}_2^T\bar{y}.$$

Figure 10:
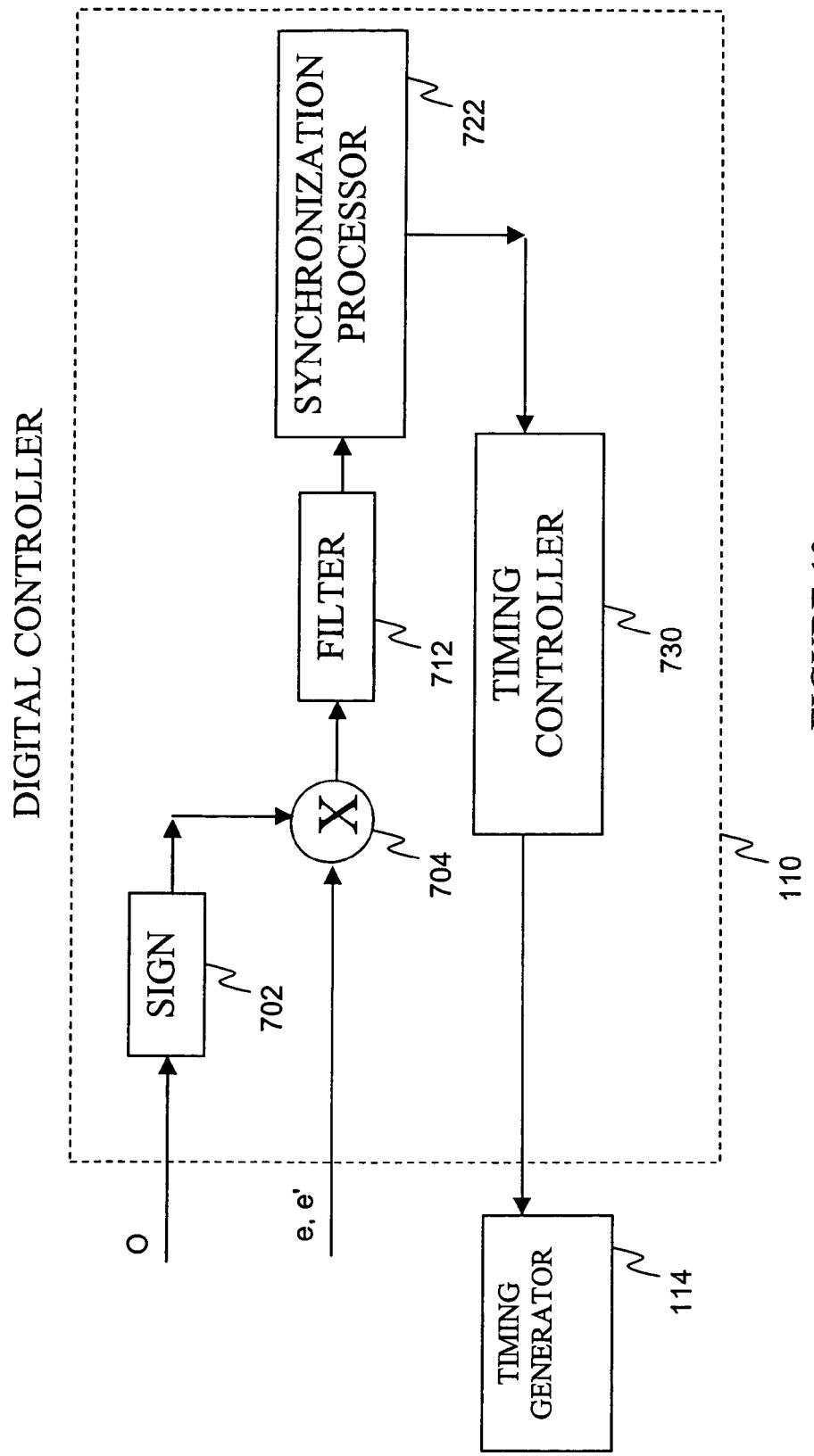
FIG. 10 illustrates an exemplary digital controller of a receiver used, e.g., to track and maintain synchronization with the received pulse stream.

Thus, e'=e, but the computation of e' in FIG. 9B requires one less mixer, one less integrator, and one less A/D converter than the computation of e in FIG. 9A. FIG. 10 shows the processing blocks employed within digital controller 110 of a receiver to track and maintain synchronization with the received pulse stream. The sampled on-time signal o enters block 702 where the sign of the sample is calculated. As the error signal e or e' enters digital controller 110, it is multiplied by the sign of the on-time signal at multiplier 704. This step helps to make the interpretation of the error signal independent of the sign of the data bit. The result is passed to digital filter 712. This digital filter may take on many forms as described in the discussion of FIG. 5. The filtered error signal ρ is passed to the synchronization processor 722 where actions are taken to improve the quality of the current synchronization. This block is further discussed below. Instructions are passed to timing controller 730, which, in turn, instructs timing generator 114 how to move the phase.

Figure 11A:
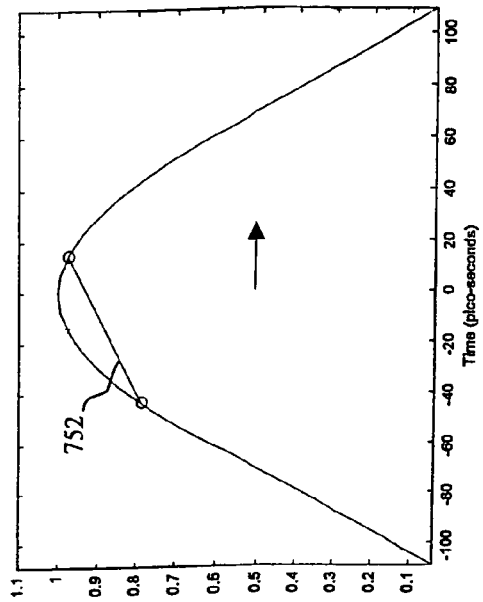
FIGS. 11A-C illustrate various tracking error signals relative to a correlation function.
Figure 11B:
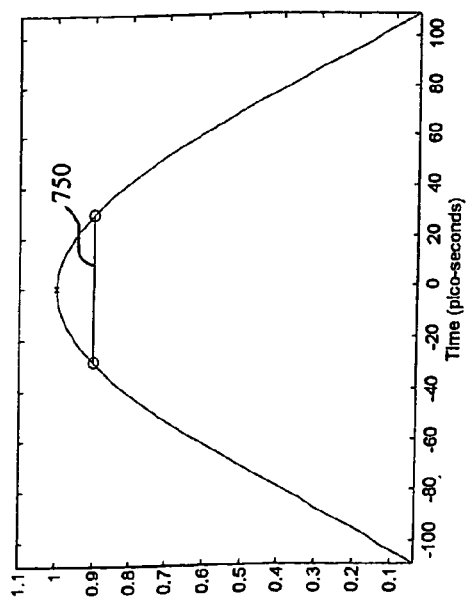
Figure 11C:
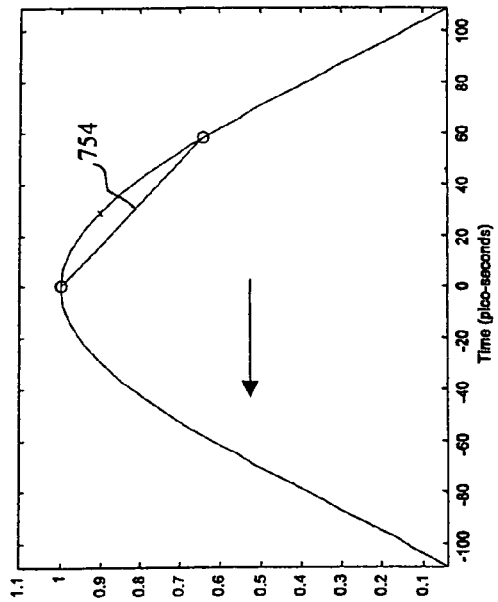

The tracking configurations of FIGS. 9 and 10 are referred to as delay-lock-loops (DLL). The DLL computes the values of the correlation function at a point to the left (lead point) and a point an equal distance to the right (lag point) of the operation (or on-time) point. FIGS. 11A-11C illustrate the lead and lag points, marked with o's, on the main-lobe of the correlation function. FIG. 11A illustrates the case when the on-time value is at the maximum of the correlation function. As we can see from this perfectly aligned example, the slope 750 between the lag and the lead point (which is the error signal) is zero indicating that no correction is necessary. When the systems are not perfectly aligned, the size of the slope indicates the amount of correction that must be made. FIG. 1B shows the slope 752 when the phase of the locally generated pulse stream lags the phase of the arriving signal by a moderate amount. FIG. 11C shows the slope 754 when the phase of the locally generated pulse stream leads the phase of the arriving signal by a larger amount, indicated by a larger slope.

Figure 12:
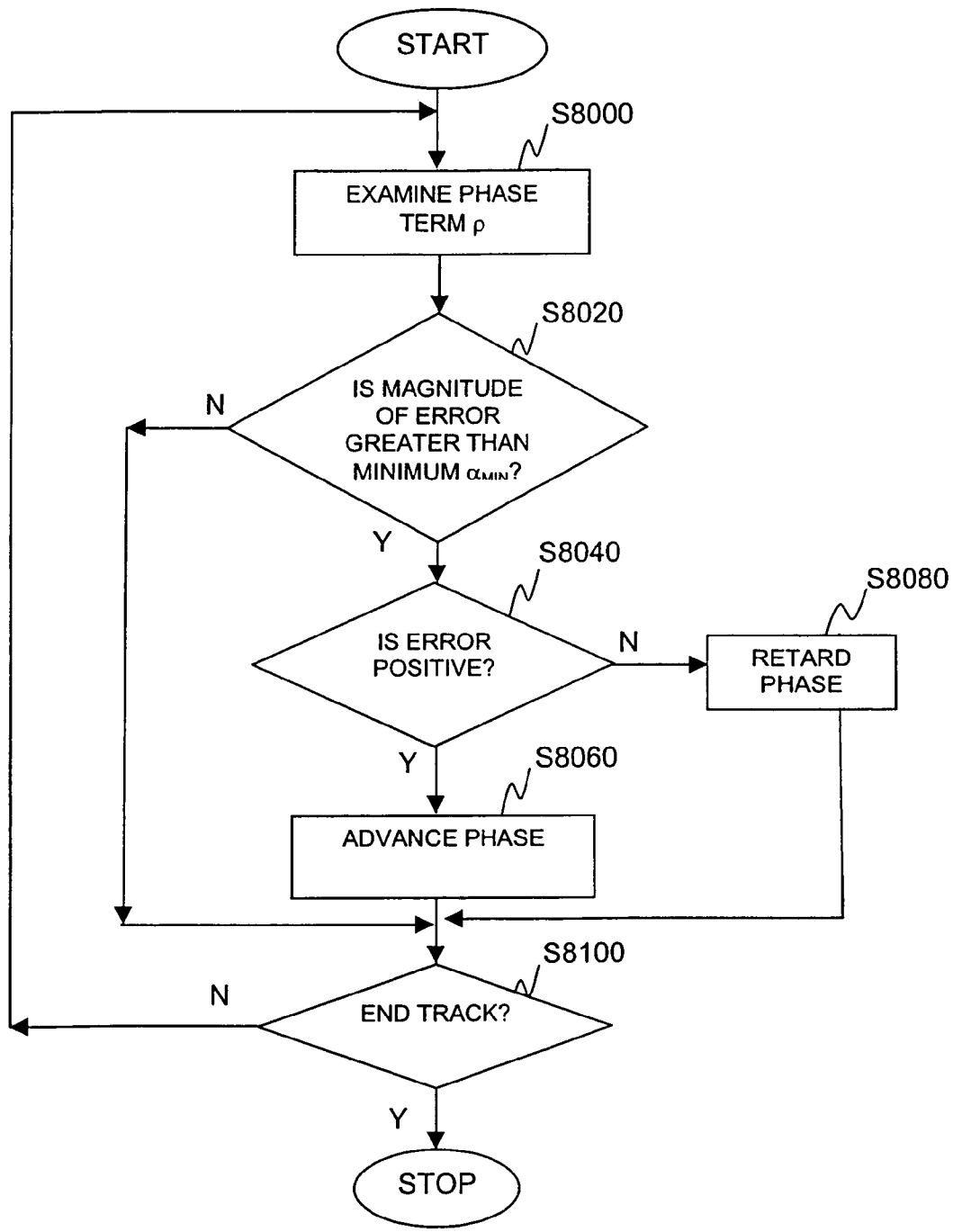
FIG. 12 is a flowchart outlining an exemplary process employed to track the phase of the incoming signal through use of the phase error signal of FIGS. 11A-C.

FIG. 12 shows a flow chart of an exemplary embodiment of the synchronization processor block 722 in FIG. 10. The process begins with the examination of the error term ρ in step S8000. In step S8020, a determination is made whether the magnitude of the error term is above the minimum threshold. If the answer is no, the error is considered too small to correct, and the process proceeds to step S8100. However, if the magnitude of the error term ρ is greater than the minimum threshold, then the sign of the error term is determined in step S8040. If the error is positive, the phase of the timing generator is advanced in step S8060. Otherwise, the phase of the timing generator is retarded in step S8080. The amount of the phase adjustments in steps S8060 and S8080 may or may not depend upon the size of the error term. In one embodiment, bang-bang control may be employed where the phase is always advanced or retarded by a fixed amount, for example 12 picoseconds. In another embodiment, proportional control may be employed where the size of the phase adjustment depends on the magnitude of the error term. Following any phase adjustments, an inquiry is made whether to terminate tracking in step S8100. If the answer is yes, the process stops. If the answer is no, process flow returns to step S8000.

It is also possible to perform tracking without the additional hardware and processing blocks demonstrated in FIGS. 9 and 10. The configuration of FIG. 3, where only the on-time correlation value is computed, can be used for tracking as well as acquisition. As discussed in regard to the illustrative examples of FIGS. 4A, 4B, and 4C, synchronization through correlation of the received pulse train with a locally generated pulse train can include correlating over the entire range of phases (i.e., from zero to 2π radians). At some phase angle $\phi_{max}$, the correlation between the received pulse train and the locally generated pulse train is a maximum (208), and if the signal-to-noise ratio is sufficiently high, then some portion of the correlation result is above a magnitude threshold $T_R$ and/or the bit-error-rate threshold.

Figure 13:
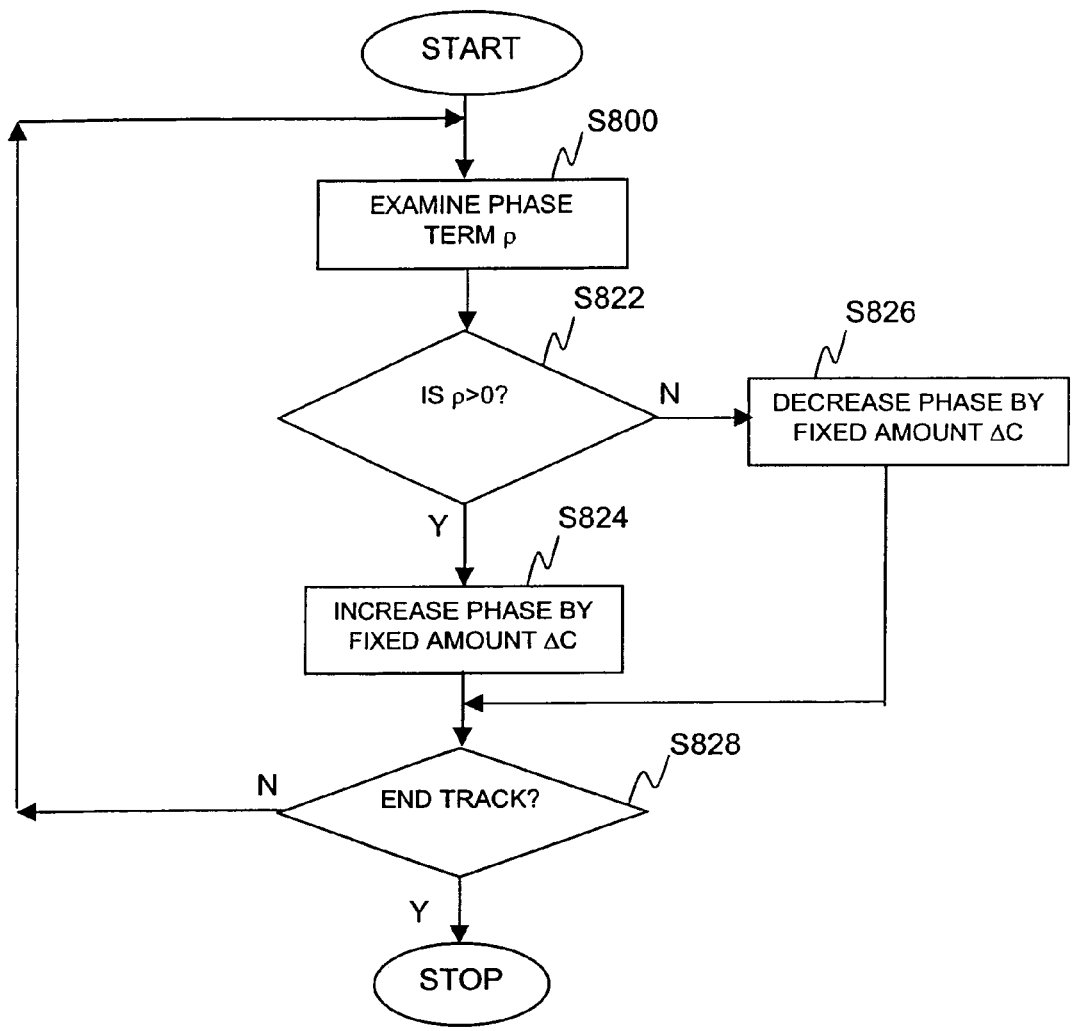
FIG. 13 illustrates a particular embodiment of a process for maintaining synchronization with an incoming signal

FIG. 13 is a flowchart showing a particular embodiment of the general embodiment of FIGS. 10 and 12 that shown an invention for maintaining synchronization with an incoming signal. In step S820, the phase term Δ is examined. For example, filter 712 in FIG. 10 may be all-pass with the output Δ equal to the input. In step S822, an inquiry is made as to whether or not Δ is greater than 0. If Δ is greater than zero, the phase is advanced by a fixed amount )C in step S824. An example value of )C is 12 picoseconds. In other embodiments of the invention, the size of )C need not be fixed. If Δ is not greater than 0, the phase is retarded by a fixed amount )C in step S826. After the phase adjustment, an inquiry is made whether or not to terminate tracking in step S828. If the answer is yes, the process stops. Otherwise, the process flow returns to step S820.

To keep production costs low, it is possible to purchase oscillators for use in UWB transceivers with a larger variance in frequency output. Since the local oscillator at the transmitter is not necessarily at the exact same frequency as the receiver, the receiver must constantly adjust the phase of timing generator 114 in FIG. 3. This ramping change in phase is indicative of the frequency offset. During periods when the receiver is not receiving a signal from the transmitter, the phases of the two systems may drift apart to the point where an entire acquisition cycle must be exercised to re-establish the communications link. To reduce the necessity of exercising an entire acquisition cycle and to reduce the number of phase adjustments needed, a frequency offset can be computed in the digital controller 110 of FIG. 3, and a frequency correction can be issued to timing generator 114.

Figure 14:
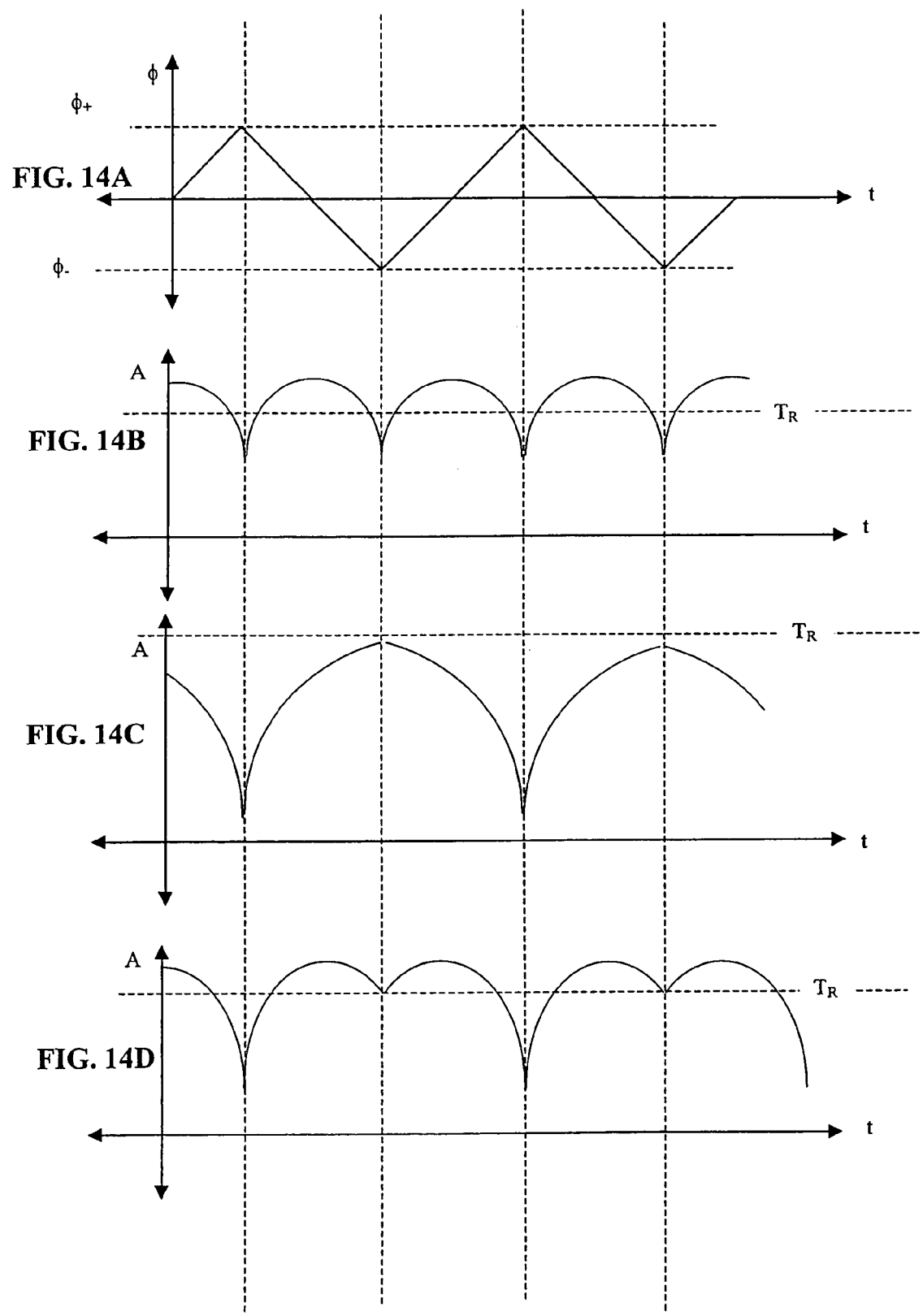
FIGS. 14A-D show an exemplary linear phase scan as a function of time, and potential resulting correlation functions of the incoming signal and the local pulse according to one embodiment of the present invention.

Another method, according to the present invention, for synchronization through correlation involves correlating the received pulse train with a locally generated pulse train over a limited range (<2π) of phases. This method is particularly useful during tracking of the received pulse after the initial acquisition, as small changes in the phase of the received pulse may arise, for example, due to changes in the position of the transmitter relative to the receiver or changes in the temperature of the transmitter and/or receiver causing the oscillators to drift. FIG. 13A illustrates a potential phase scan over time between a maximum phase angle $\phi_+$ and a minimum phase angle $\phi_-$ where $\phi_+ - \phi_- < 2\pi$. As illustrated in FIG. 14A, the scan is linear, although other embodiments, such as a sinusoidal phase scan, are within the scope of the present invention. Although the phase scan is drawn as piece-wise continuous, it may be that only discreet phases are employed over the illustrated range. Illustrative examples of correlations between received and locally generated pulse trains over this phase scan are provided in FIGS. 14B, 14C, and 14D, respectively, along with an exemplary magnitude threshold $T_R$. FIGS. 14B, 14C, and 14D are illustrated examples only, and other forms of both phase scans and the resulting correlations are possible according to the present invention.

FIG. 14B illustrates a correlation result over a phase angle $<2\pi$ between the received and locally generated pulse trains when a phase scan such as that illustrated in FIG. 14A is substantially centered about the phase angle that provides the maximum correlation value, namely $\phi_{max}$ illustrated in FIG. 4C. In other words, the phase is scanned between the maximum phase angle $\phi_+$ and the minimum phase angle $\phi_-$ through the phase angle $\phi_{max}$ that provides the maximum correlation value such that $\phi_+ - \phi_{max}$ is approximately equal to $\phi_{max} - \phi_-$. The resulting correlation as a function of time (and phase, since phase is scanned) presented in FIG. 14B thus includes the maximum 208, as illustrated in FIG. 4C, as well as the correlation values immediately surrounding the maximum 208, some of which are above the exemplary magnitude threshold $T_R$ in FIG. 14B.

FIG. 14C illustrates a correlation result over a phase angle $<2\pi$ when a phase scan such as illustrated in FIG. 14A is substantially centered on the rising portion of the correlation. As illustrated in FIGS. 4A and 4C, the phase angle between the received and locally generated pulse trains is within $+/-\frac{1}{2} T_p$ of the phase angle $\phi_{max}$ that provides the maximum correlation value, where $T_p$ is the peak-to-peak pulse width of the illustrative pulse. The slope, concavity, RMS value, and phase (for example) of the function illustrated in FIG. 14C will change depending upon where the maximum phase angle $\phi_+$ and the minimum phase angle $\phi_-$ are located within the range of $+/-\frac{1}{2} T_p$ of the phase angle $\phi_{max}$ that provides the maximum correlation value. Nevertheless, certain characteristics of this illustrated correlation can be used to identify the position of the phase scan relative to phase angle $\phi_{max}$ that provides the maximum correlation value. For example, the illustrated correlation result fails to rise above the exemplary magnitude threshold $T_R$, indicating that an adequately high signal-to-noise ratio is not present over this portion of the scanned phase range.

FIG. 14D illustrates a correlation result over a phase angle $<2\pi$ between the received and locally generated pulse trains when a phase scan such as illustrated in FIG. 14A contains the phase angle $\phi_{max}$ that provides the maximum value of the correlation, but is not centered thereupon. Once again, the slope, RMS value, and phase (for example) of the function illustrated in FIG. 14D will change depending upon where the maximum phase angle $\phi_+$ and the minimum phase angle $\phi_-$ are located relative to the phase angle $\phi_{max}$ that provides the maximum correlation value.

There are several different methods for distinguishing the functions illustrated in FIGS. 14B, 14C, and 14D that can be used to identify the phase angle $\phi_{max}$ that provides the maximum correlation magnitude. The distinguishing characteristics can be used, e.g., by the synchronization processor 720 in FIG. 5 to provide a control signal to the timing generator 114 of FIG. 3 for synchronizing the locally generated pulse train with a received pulse train. Available methods for distinguishing these functions include, but are not limited to, determining which portions of the correlation result are above the exemplary magnitude threshold $T_R$, determining if the RMS value of the correlation is above the exemplary magnitude threshold $T_R$, determining if the AC peak-to-peak value of the correlation is below a certain threshold, determining if one or more parameters related to the bit-error-rate are above a threshold, and determining if the spectral content of the correlation is above or below a predetermined threshold (e.g., the correlation illustrated in FIG. 14B has a ratio of spectral power density of the second harmonic to the fundamental frequency that is higher than some threshold value, where the fundamental frequency has the periodicity of the phase scan illustrated in FIG. 14A). Regardless of how a control signal based upon the correlation between the received and locally-generated pulse trains is obtained, it can be used to synchronize the pulse trains and provide and/or maintain UWB communications using a predetermined threshold, such as the exemplary magnitude threshold $T_R$. In addition, the correlation-derived control signal drives the phase scan range to be centered about $\phi_{max}$.

Figure 15:
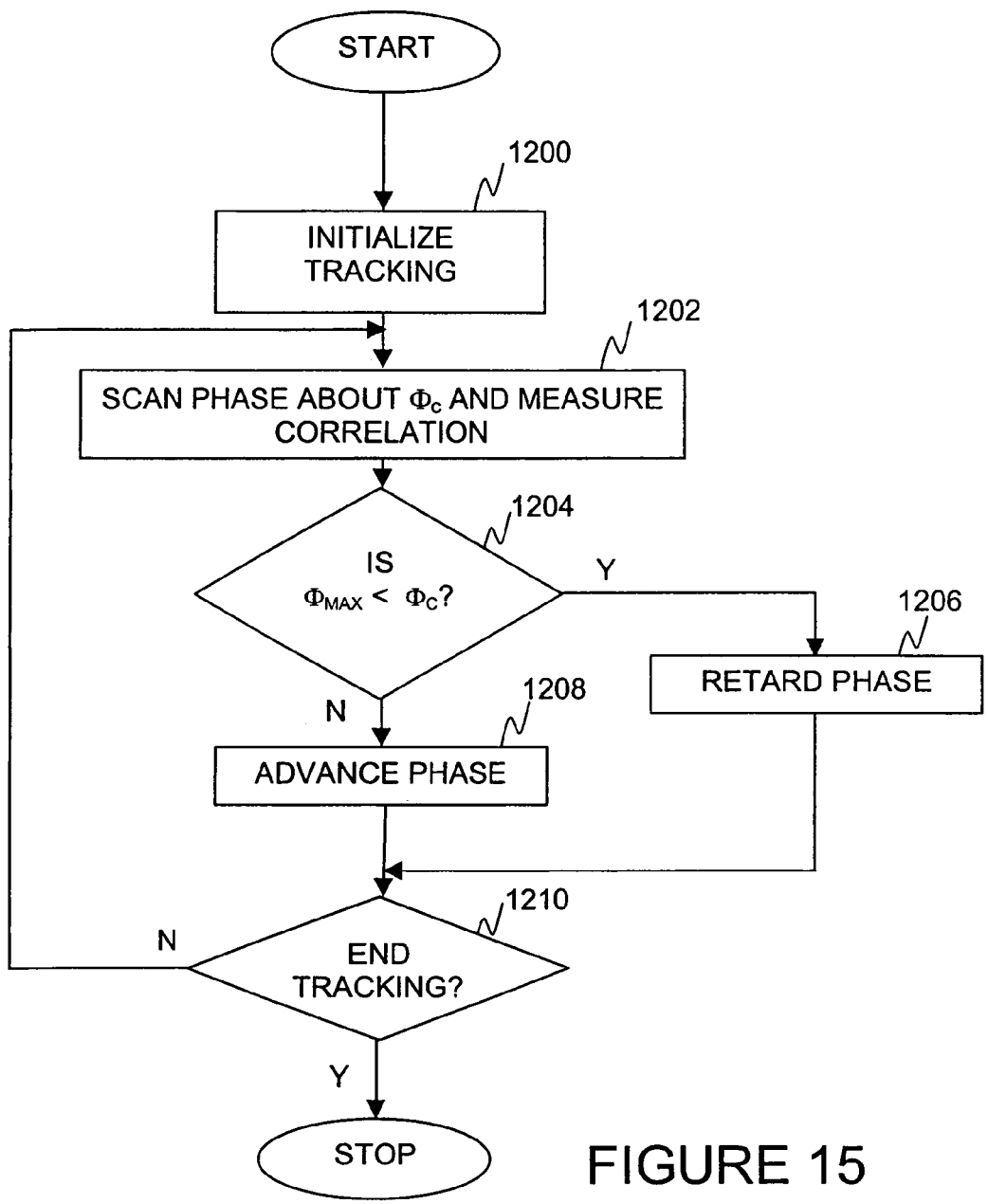
FIG. 15 is a flowchart of an embodiment of a process for tracking a received pulsetrain after correlation over a limited phase range scan.

FIG. 15 is a flowchart of an embodiment of a process for tracking a received pulse train after correlating over a limited phase range. This process may be employed in the synchronization processor block 720 of FIG. 5. After tracking has been initialized in step 1200, the phase is scanned about a center phase angle $\phi_c$ (commonly midway between the maximum phase angle $\phi_+$ and the minimum phase angle $\phi_-$) and the correlation between the phase swept locally generated pulse train and the received pulse train is determined. In step 1204, the phase angle $\phi_{max}$ that provides the maximum value of the correlation is determined, relative to the center phase angle $\phi_c$ (and naturally the maximum phase angle $\phi_+$ and the minimum phase angle $\phi_-$). If $\phi_{max}$ is less than $\phi_c$, then the phase of timing generator 114 is retarded as illustrated in step 1206 and $\phi_c$ is reduced. If $\phi_{max}$ is greater than $\phi_c$, then the phase of timing generator 114 is advanced as illustrated in step 1208 and $\phi_c$ is increased. After any phase adjustments, an inquiry is made whether to end tracking is step 1210. If the answer is yes, then the process terminated. Otherwise, the process flow returns to step 1202. As before, the method of making a phase adjustment can include either bang-bang or proportional control techniques. If proportional control is employed, it is likely that the phase error term ($\phi_c - \phi_{max}$) will be averaged before a phase adjustment is made. Many forms of averaging and/or signal processing are well known in the art, and include but are not limited to boxcar averaging, weighted boxcar averaging, curve fitting, and other methods of preparing one or more periods of the correlation function for analysis.

Figure 16:
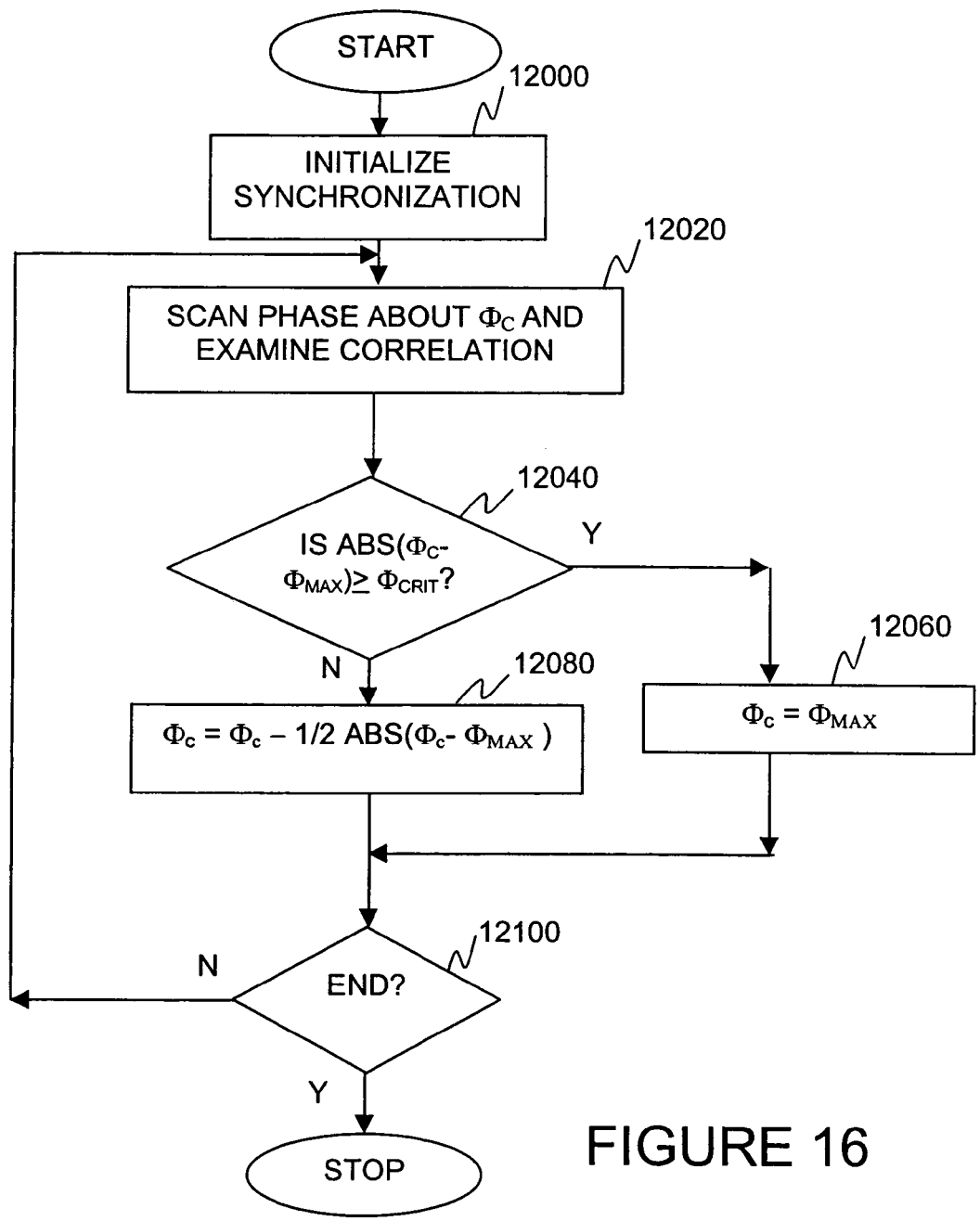
FIG. 16 is a flowchart of an embodiment of a process for tracking a pulsetrain after correlating over a limited phase range scan.

FIG. 16 is a flowchart of an embodiment of a process for tracking a pulsetrain after correlating over a limited phase range scan. After tracking has been initialized in step 12000, the phase is scanned about a center phase angle $\phi_c$ (commonly midway between the maximum phase angle $\phi_+$ and the minimum phase angle $\phi_-$) and the correlation between the swept locally generated pulse train and the received pulse train is determined in step 12020. In step 12040, the absolute value of the difference in phase angle between the phase angle $\phi_{max}$ that provides the maximum value of the correlation and the center phase angle $\phi_c$ (and, by extension, the maximum phase angle $\phi_+$ and the minimum phase angle $\phi_-$) is compared to a predetermined critical phase angle $\phi_{CRIT}$. If the absolute value of the difference is larger than the predetermined critical phase angle $\phi_{CRIT}$, then a new center phase angle $\phi_c$ is immediately set to the newly located maximum correlation value $\phi_{max}$ as illustrated in step 12060. On the other hand, if the absolute value of the difference is smaller than the predetermined critical phase angle $\phi_{CRIT}$, then the process flow proceeds to step 12080 wherein a new center phase angle $\phi_c$ located midway between the old center phase angle $\phi_c$ and the phase angle $\phi_{max}$ that provides the maximum value of the correlation is selected. This is a form of averaging that will, in effect, damp out large swings in the center phase angle $\phi_c$ that may arise spuriously, e.g., due to noise. Other forms of averaging and/or signal processing are well known in the art, and include but are not limited to boxcar averaging, weighted boxcar averaging, curve fitting, and other methods of preparing one or more periods of the correlation function for analysis. In step 12100, it is determined if the user wishes to and/or can maintain synchronization with the received signal. If the synchronization is not going to end, then the process flow returns to step 12020, and another scan about the new center phase angle $\phi_c$ is performed. Naturally, the scanned phase angle range can be adjusted (e.g., decreased) prior to returning to step 12020 if, for example, the determination in step 12040 is positive.

Figure 17:
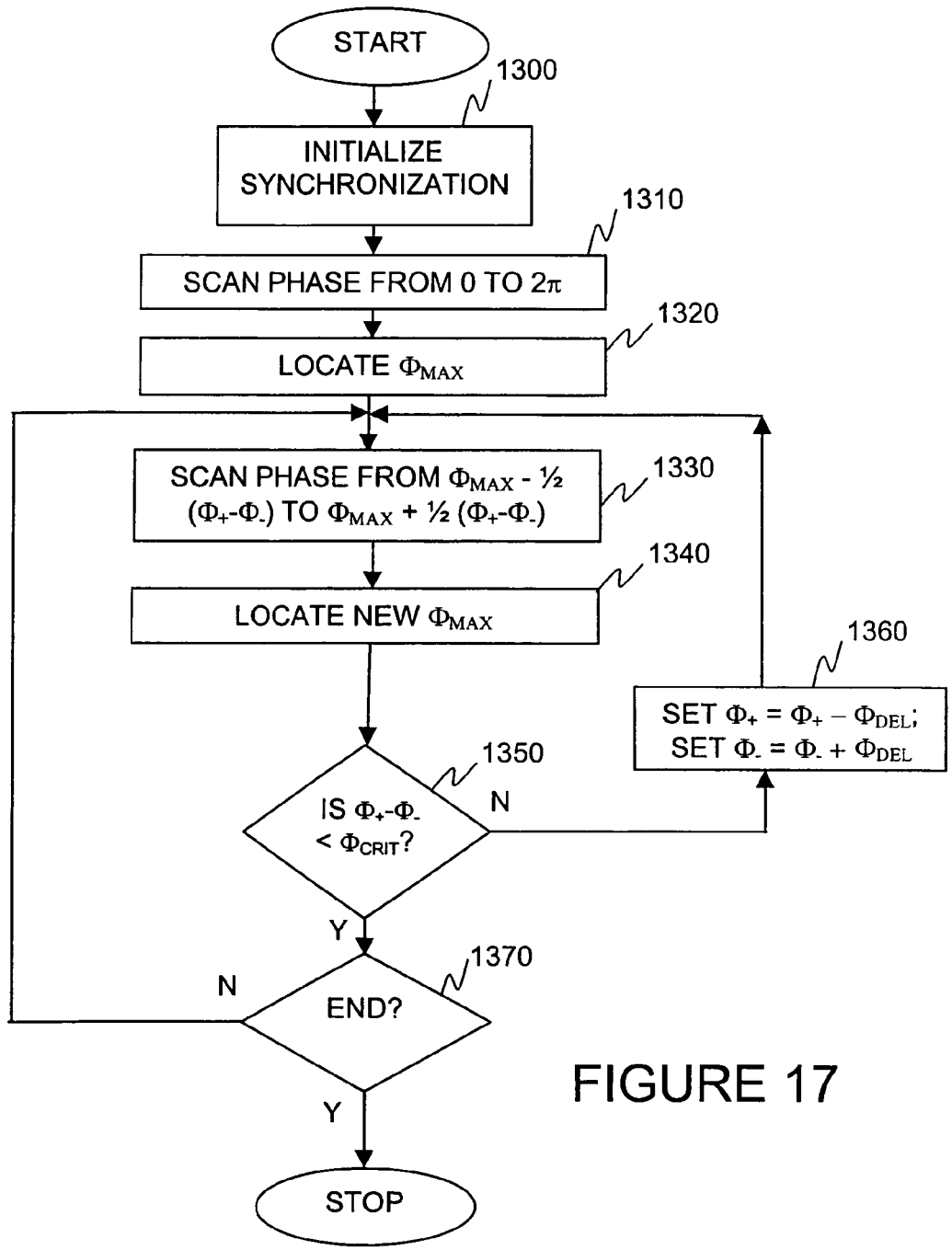
FIG. 17 is a flowchart of an embodiment for transitioning between a full phase range scan to a limited phase range scan.

FIG. 17 is a flowchart of an embodiment for transitioning between a full phase range scan to a limited phase range scan which may be employed for a combined acquisition and tracking process. In step 1300, synchronization is initialized. In step 1310, a full phase range scan (between 0 and 2π radians) is performed. In step 1320, the phase angle $\phi_{max}$ that provides the maximum value of the correlation is determined. In step 1330, the correlation is computed over a new, reduced phase range centered about the current phase angle $\phi_{max}$. In step 1340, a new phase angle $\phi_{max}$ that provides the maximum correlation value is identified. Once the new $\phi_{max}$ has been identified, the process flow proceeds to step 1350, where a determination is made as to whether or not the range of phase angles needs to be narrowed by comparing the range of phase angles ($\phi_+$-$\phi_-$) to a predetermined critical phase angle $\phi_{CRIT}$. If the range of phase angles is still larger than the predetermined critical phase angle $\phi_{CRIT}$, then the process flow proceeds to step 1360 where a new and reduced range of phase angles (i.e., a new $\phi_+$ and $\phi_-$) are set. From there, the process flow returns to step 1330. However, if the range of phase angles was already smaller than the predetermined critical phase angle $\phi_{CRIT}$, then the process flow proceeds to step 1370, where it is determined where or not to terminate the acquisition/tracking process. If the synchronization is not going to end, then the process flow returns to step 1330, and another scan is performed.

The initial 2π phase scan allows the process to move within a neighborhood of the phase angle where the maximum correlation magnitude occurs. Then, the estimate of this phase is repeatedly refined until only a small phase window needs to be scanned. At this point, the receiver is tracking the phase of the incoming signal.

The UWB transceiver of FIGS. 2 and 3 may be used to perform a radio transport function for interfacing with different applications as part of a stacked protocol architecture. In such a configuration, the UWB transceiver performs signal creation, transmission and reception functions as a communications service to applications that send data to the transceiver and receive data from the transceiver much like a wired I/O port. Moreover, the UWB transceiver may be used to provide a wireless communications function to any one of a variety of devices that may include interconnection to other devices either by way of wired technology or wireless technology. Thus, the UWB transceiver of FIG. 2 may be used as part of a local area network (LAN) connecting fixed structures or as part of a wireless personal area network (WPAN) connecting mobile devices, for example. In any such implementation, all or a portion of the present invention may be conveniently implemented in a microprocessor system using conventional general purpose microprocessors programmed according to the teachings of the present invention, as will be apparent to those skilled in the microprocessor systems art. Appropriate software can be readily prepared by programmers of ordinary skill based on the teachings of the present disclosure, as will be apparent to those skilled in the software art.

Figure 18:
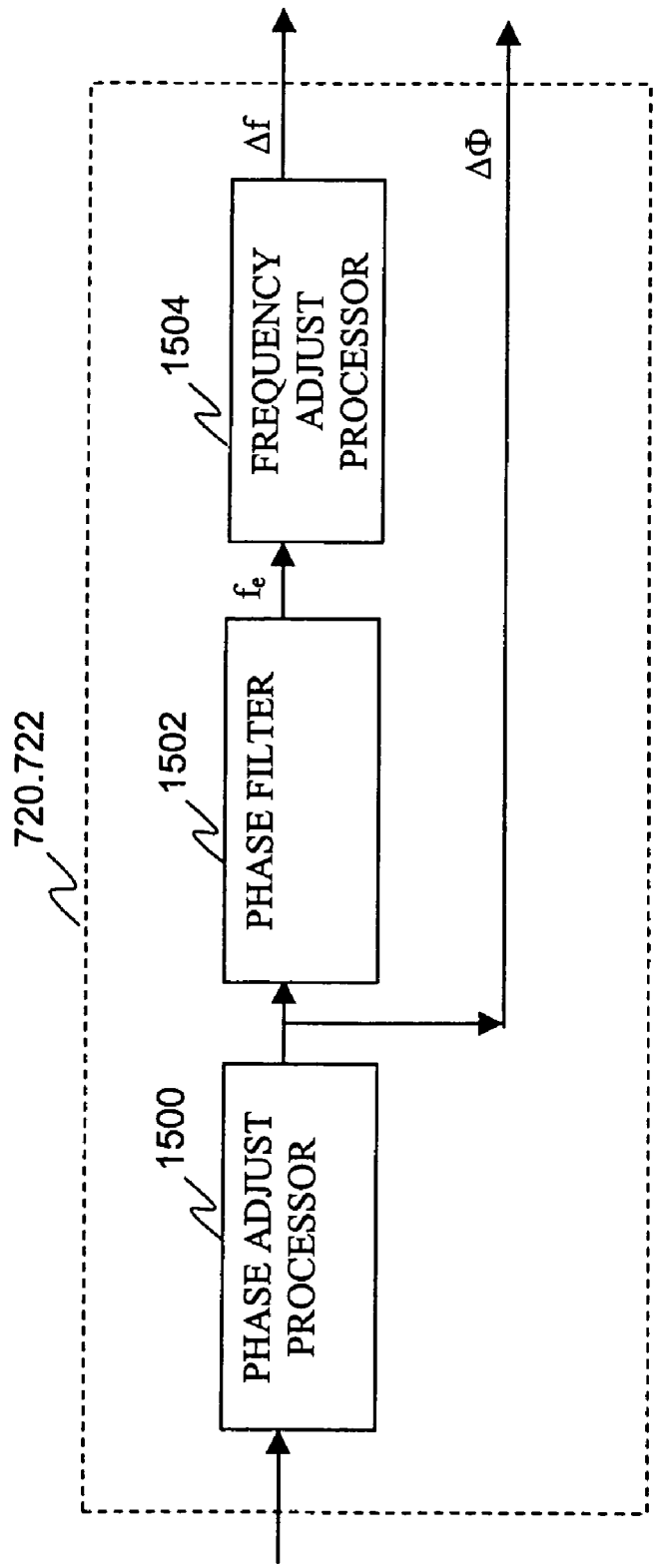
FIG. 18 illustrates a block diagram of an embodiment of the synchronization processor.

FIG. 18 shows a block diagram of an embodiment of the synchronization processor 720, 722 of FIGS. 5 and 10, respectively. In FIG. 18, a phase error term arrives at phase adjust processor block 1500. This phase adjust process can be similar to those shown in FIGS. 12, 13, 15, 16, and 17. The resulting phase adjustment is sent to timing controller 730 in FIGS. 5 and 10. The phase adjustment )0 is also passed to phase filter block 1502. In one embodiment of the invention, this phase filter may be a leaky integrator. However, as with the discussion of filters 710 and 712 in FIGS. 5 and 10, respectively, this filter may encompass many embodiments. The output of phase filter 1502 is a parameter $f_e$ that is related to the frequency difference between the UWB receiver and the UWB transmitter, for example it may be the accumulated phase error over a period of time. The parameter $f_e$ is passed to frequency adjust processor block 1504. The frequency adjust processor block 1504 processes $f_e$ to determine an appropriate frequency adjustment )f to pass to timing controller 730.

Figure 19:
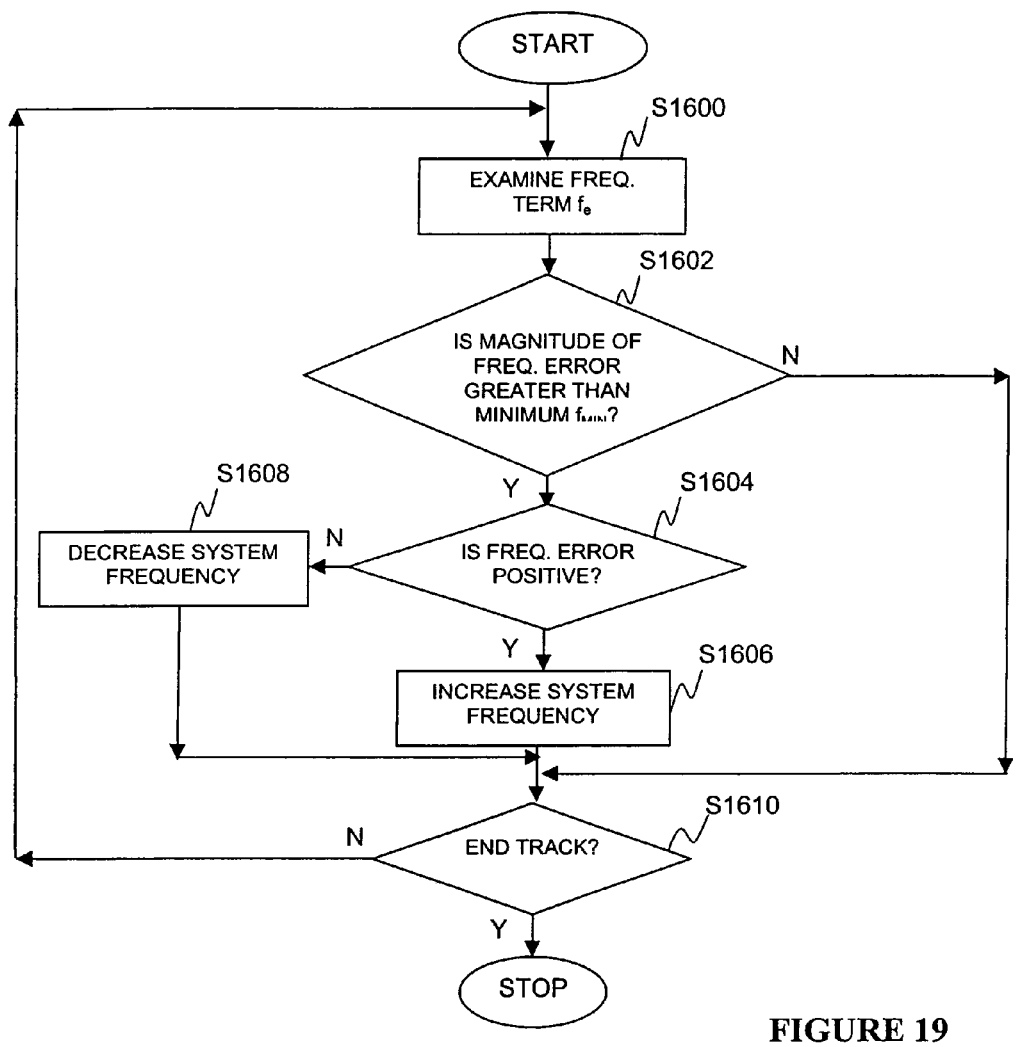
FIG. 19 is a flowchart illustrating an exemplary process performed by a frequency adjust processor.

FIG. 19 is a flowchart describing a general embodiment of frequency adjust processor block 1502 in FIG. 18. In step S1600, the parameter related to frequency error $f_e$ is examined. An inquiry is made whether the magnitude of $f_e$ is large enough to warrant a frequency correction in step S1602. If the magnitude of $f_e$ is not large enough (greater than $f_{min}$), then the process flow proceeds to step S1610. Otherwise, an inquiry is made as to whether the frequency error is positive or negative in step S1604. If the frequency error is positive, the frequency of the system is increased by a value )f, in step S1606. If the frequency error is negative, the frequency of the system is decreased in step S1608. After frequency adjustments, an inquiry is made as to whether or not to terminate tracking. If the answer is yes, the process ends. If the answer is no, the process flow returns to step S1600. The amount of the frequency adjustments in steps S1606 and S1608 may or may not depend upon the size of the error term. In one embodiment, bang-bang control may be employed where the frequency is always advanced or retarded by a fixed amount, for example 25 Hz. In another embodiment, proportional control may be employed where the size of the frequency adjustment depends on the magnitude of the error term.

Figure 20:
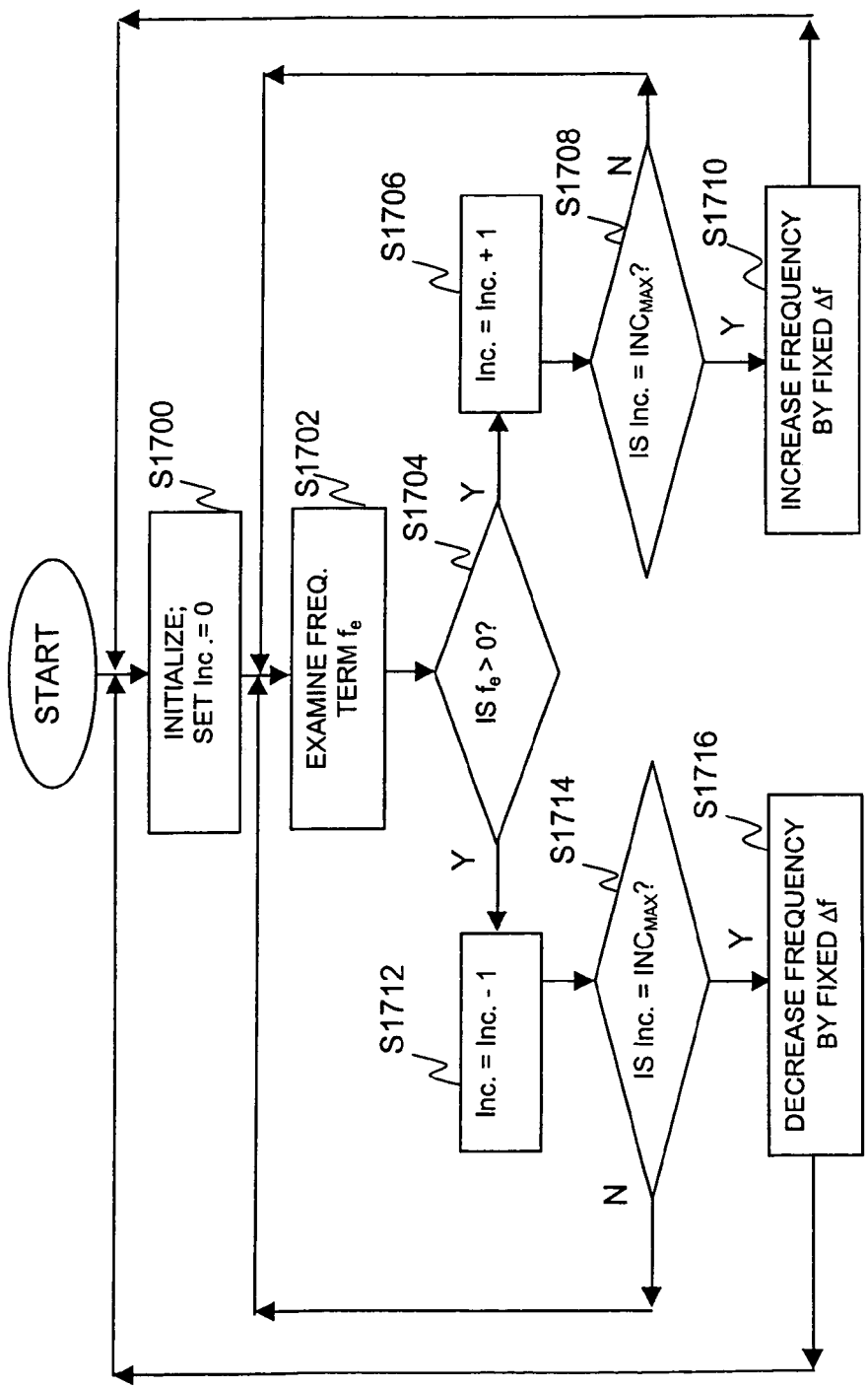
FIG. 20 is a flowchart illustrating a particular embodiment of the frequency adjustment process.

FIG. 20 is a flowchart of a particular embodiment of the frequency adjustment technique outlined in FIGS. 18 and 19. In step S1700, the process flow is initialized and the phase increment counter Inc is initialized to zero. The frequency term $f_e$ is examined in step S1702. For example, it can be assumed that phase filter 1502 in FIG. 18 is all pass and thus $f_e$=)0. In step S1704, $f_e$ is compared to zero. If $f_e$ is greater than zero, the phase increment counter is incremented by one in step S1706. Inc is compared to maximum allowable number of increments. $INC_{max}$ in step S1708. For example, $INC_{max}$ can be set equal to 32. If Inc is not equal to $INC_{max}$, then the process flow returns to step 1702. Otherwise, the frequency is increased by a fixed increment )f in step S1710. An example of )f may be 50 Hz. Note that in other embodiments, )f need not be fixed. The process flow then returns to step S1700. On the other hand, if $f_e$ is not greater than 0 at step S1704, then the phase increment counter is decremented in step S1712. The value of Inc is compared to the minimum number of allowable phase decrements $INC_{min}$ in step S1714. For example, $INC_{min}$ can be set equal to −32. If Inc is not equal to $INC_{min}$, then the process flow returns to step S1702. Otherwise, the frequency is decreased by a fixed amount of )f. The process flow then returns to step S1700.

Figure 21:
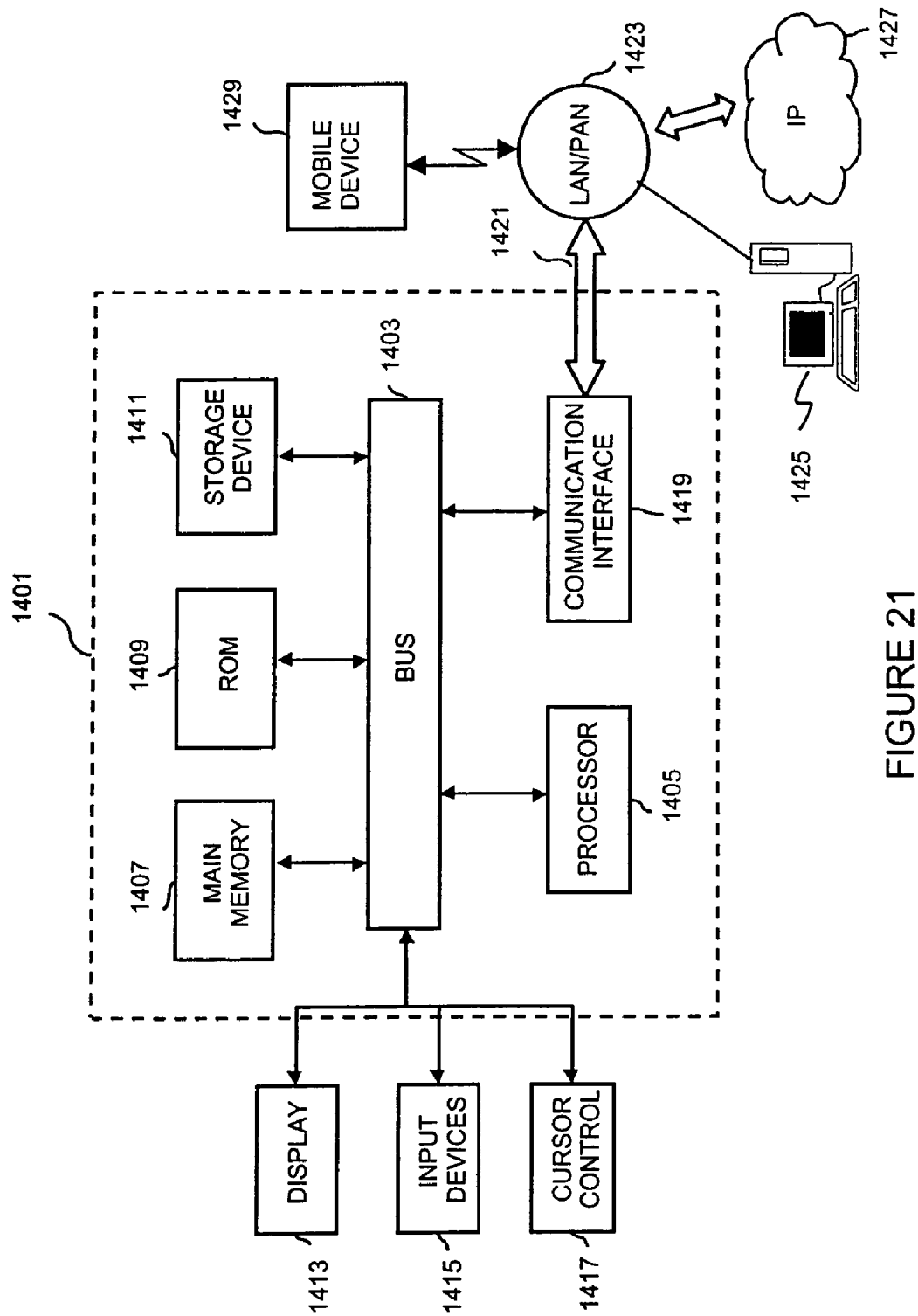
FIG. 21 illustrates a processor system in which an embodiment of the present invention may be implemented

FIG. 21 illustrates a processor system 1401 upon which an embodiment according to the present invention may be implemented. The system 1401 includes a bus 1403 or other communication mechanism for communicating information, and a processor 1405 coupled with the bus 1403 for processing the information. The processor system 1401 also includes a main memory 1407, such as a random access memory (RAM) or other dynamic storage device (e.g., dynamic RAM (DRAM), static RAM (SRAM), synchronous DRAM (SDRAM), flash RAM), coupled to the bus 1403 for storing information and instructions to be executed by the processor 1405. In addition, a main memory 1407 may be used for storing temporary variables or other intermediate information during execution of instructions to be executed by the processor 1405. The system 1401 further includes a read only memory (ROM) 1409 or other static storage device (e.g., programmable ROM (PROM), erasable PROM (EPROM), and electrically erasable PROM (EEPROM)) coupled to the bus 1403 for storing static information and instructions for the processor 1405. A storage device 1411, such as a magnetic disk or optical disc, is provided and coupled to the bus 1403 for storing information and instructions.

The processor system 1401 may also include special purpose logic devices (e.g., application specific integrated circuits (ASICs)) or configurable logic devices (e.g., simple programmable logic devices (SPLDs), complex programmable logic devices (CPLDs), or re-programmable field programmable gate arrays (FPGAs)). Other removable media devices (e.g., a compact disc, a tape, and a removable magneto-optical media) or fixed, high density media drives, may be added to the system 301 using an appropriate device bus (e.g., a small system interface (SCSI) bus, an enhanced integrated device electronics (IDE) bus, or an ultra-direct memory access (DMA) bus). The system 1401 may additionally include a compact disc reader, a compact disc reader-writer unit, or a compact disc jukebox, each of which may be connected to the same device bus or another device bus.

The processor system 1401 may be coupled via the bus 1403 to a display 1413, such as a cathode ray tube (CRT) or liquid crystal display (LCD) or the like, for displaying information to a system user. The display 1413 may be controlled by a display or graphics card. The processor system 1401 includes input devices, such as a keyboard or keypad 1415 and a cursor control 1417, for communicating information and command selections to the processor 1405. The cursor control 1417, for example, is a mouse, a trackball, or cursor direction keys for communicating direction information and command selections to the processor 1405 and for controlling cursor movement on the display 1413. In addition, a printer may provide printed listings of the data structures or any other data stored and/or generated by the processor system 1401.

The processor system 1401 performs a portion or all of the processing steps of the invention in response to the processor 1405 executing one or more sequences of one or more instructions contained in a memory, such as the main memory 1407. Such instructions may be read into the main memory 1407 from another computer-readable medium, such as a storage device 1411. One or more processors in a multi-processing arrangement may also be employed to execute the sequences of instructions contained in the main memory 1407. In alternative embodiments, hard-wired circuitry may be used in place of or in combination with software instructions. Thus, embodiments are not limited to any specific combination of hardware circuitry and software.

As stated above, the processor system 1401 includes at least one computer readable medium or memory programmed according to the teachings of the invention and for containing data structures, tables, records, or other data described herein. Stored on any one or on a combination of computer readable media, the present invention includes software for controlling the system 1401, for driving a device or devices for implementing the invention, and for enabling the system 1401 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpretable programs, dynamic link libraries, Java or other object oriented classes, and complete executable programs. Moreover, parts of the processing of the present invention may be distributed for better performance, reliability, and/or cost.

The term "computer readable medium" as used herein refers to any medium that participates in providing instructions to the processor 1405 for execution. A computer readable medium may take many forms, including but not limited to, non-volatile media, volatile media, and transmission media. Non-volatile media includes, for example, optical, magnetic disks, and magneto-optical disks, such as the storage device 1411. Volatile media includes dynamic memory, such as the main memory 1407. Transmission media includes coaxial cables, copper wire and fiber optics, including the wires that comprise the bus 1403. Transmission media may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave, carrierless transmissions, or any other medium from which a system can read.

Various forms of computer readable media may be involved in providing one or more sequences of one or more instructions to the processor 1405 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to system 1401 may receive the data on the telephone line and use an infrared transmitter to convert the data to an infrared signal. An infrared detector coupled to the bus 1403 can receive the data carried in the infrared signal and place the data on the bus 1403. The bus 1403 carries the data to the main memory 1407, from which the processor 1405 retrieves and executes the instructions. The instructions received by the main memory 1407 may optionally be stored on a storage device 1411 either before or after execution by the processor 1405.

The processor system 1401 also includes a communication interface 1419 coupled to the bus 1403. The communications interface 1419 provides a two-way UWB data communication coupling to a network link 1421 that is connected to a communications network 1423 such as a local network (LAN) or personal area network (PAN) 1423. For example, the communication interface 1419 may be a network interface card to attach to any packet switched UWB-enabled personal area network (PAN) 1423. As another example, the communication interface 1419 may be a UWB accessible asymmetrical digital subscriber line (ADSL) card, an integrated services digital network (ISDN) card, or a modem to provide a data communication connection to a corresponding type of communications line. The communications interface 1419 may also include the hardware to provide a two-way wireless communications coupling other than a UWB coupling, or a hardwired coupling to the network link 1421. Thus, the communications interface 1419 may incorporate the UWB transceiver of FIG. 2 and/or FIG. 3 as part of a universal interface that includes hardwired and non-UWB wireless communications coupling to the network link 1421.

The network link 1421 typically provides data communication through one or more networks to other data devices. For example, the network link 1421 may provide a connection through a LAN to a host computer 1425 or to data equipment operated by a service provider, which provides data communication services through an IP (Internet Protocol) network 1427. Moreover, the network link 1421 may provide a connection through a PAN 1423 to a mobile device 1429 such as a personal data assistant (PDA) laptop computer, or cellular telephone. The LAN/PAN communications network 1423 and IP network 1427 both use electrical, electromagnetic or optical signals that carry digital data streams. The signals through the various networks and the signals on the network link 1421 and through the communication interface 1419, which carry the digital data to and from the system 1401, are exemplary forms of carrier waves transporting the information. The processor system 1401 can transmit notifications and receive data, including program code, through the network(s), the network link 1421 and the communication interface 1419.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for tracking an incoming ultra wide bandwidth signal at an ultra wide bandwidth receiver, comprising the steps of:
   receiving incoming pulses of the incoming ultra wide bandwidth signal as a lead signal by a front end circuit;
   delaying the incoming pulses by a set delay time to generate a lag signal;
   determining an error signal based on the lead signal and the lag signal by an error determining circuit;
   determining a sign of the error signal;
   advancing a phase of a local clock if the sign has a first quality; and
   retarding the phase of the local clock if the sign has a second quality,
   wherein the incoming pulses are at least one of bi-phase modulated, and quadrature phase modulated,
   wherein adjacent pulses of the incoming pulses arrive at a predetermined interval, the predetermined interval being the time between the incoming pulses, and
   wherein the first quality is being one of positive or negative, and the second quality is being the inverse of the first quality.

2. The method for tracking an incoming ultra wide bandwidth signal, as recited in claim 1,
   generating a difference signal based on a difference between the lead signal and the lag signal,
   wherein the error signal is determined based on the difference signal, and
   wherein the difference is calculated by one of: subtracting the lead signal from the lag signal, subtracting the lag signal from the lead signal, subtracting an absolute value of the lead signal from an absolute value of the lag signal, and subtracting the absolute value of the lag signal from the absolute value of the lead signal.

3. The method for tracking an incoming ultra wide bandwidth signal, as recited in claim 2, further comprising:
   generating local pulses to form a local signal; and
   correlating the Local signal with the difference signal to produce a correlation function,
   wherein the error signal is determined based on the correlation function.

4. The method for tracking an incoming ultra wide bandwidth signal, as recited in claim 1, further comprising:
   generating local pulses to form a local signal; and
   correlating the local signal with the lag signal to produce a first correlation function; and
   correlating the local signal with the lag signal to produce a second correlation function,
   wherein the error signal is determined by calculating a difference between the first correlation function and the second correlation function, and
   wherein the difference is calculated by one of: subtracting the lead signal from the lag signal, subtracting the lag signal from the lead signal, subtracting an absolute value of the lead signal from an absolute value of the lag signal, and subtracting the absolute value of the lag signal from the absolute value of the lead signal.

5. The method for tracking an incoming ultra wide bandwidth signal, as recited in claim 1, wherein the advancing or retarding of the phase of the local clock is done by a set phase adjustment value.

6. The method for tracking an incoming ultra wide bandwidth signal, as recited in claim 1, further comprising:
   determining a magnitude of the error signal,
   wherein the advancing or retarding of the phase of the local clack is done by a variable phase adjustment value that depends on the magnitude of the error signal.

7. The method for tracking an incoming ultra wide bandwidth signal, as recited in claim 6, further comprising:
   determining whether the magnitude of the error signal is above a set threshold,
   wherein the phase of the local clock is not advanced or retarded if the magnitude of the error signal is not above the set threshold.

8. A method for tracking an incoming ultra wide bandwidth signal at an ultra wide bandwidth receiver, comprising the steps of:
   receiving incoming pulses of the incoming ultra wide bandwidth signal to farm a lead signal by a front end circuit;
   delaying the incoming pulses by a first delay time to form an on-time signal;
   delaying the incoming pulses by a second delay time to form a lag signal;
   determining an error signal based on the lead signal, the on-time signal, and the lag signal by an error determining circuit;
   generating a difference signal based on a difference between the lead signal and the lag signal;

determining an on-time sign of the on-time signal, wherein the second delay time is greater than the first delay time, wherein the incoming pulses are at least one of bi-phase modulated, and quadrature phase modulated, wherein the error signal is determined based on the difference signal and the on-time sign, and wherein the difference is calculated by one of: subtracting the lead signal from the lag signal, and subtracting the lag signal from the lead signal.

9. The method for tracking an incoming ultra wide bandwidth signal, as recited in claim 8, wherein adjacent pulses of the incoming pulses arrive at a predetermined interval, the predetermined interval being the time between the incoming pulses.

10. The method for tracking an incoming ultra wide bandwidth signal, as recited in claim 8, further comprising:

determining an error sign of the error signal;

advancing a phase of a local clock if the error sign has a first value; and retarding the phase of the local clock if the error sign has a second value.

11. The method for hacking an incoming ultra wide bandwidth signal, as recited in claim 10, wherein when the first value is positive the second value is negative, and when the first value is negative the second value is positive.

12. A system for tracking an incoming ultra wide bandwidth signal, comprising:

a front end circuit configured to receive incoming pulses of the ultra wide bandwidth signal as a lead signal;

a first delay for delaying the lead signal by a lag delay time to form a lag signal;

a summer for determining a difference signal equal to a difference between the lead signal and the lag signal;

a signal generator configured to generate local pulses as a local signal;

a correlator configured to correlate the difference signal with the local signal to produce an error signal; and a control circuit to determine the sign of the error signal and to modify a phase of the local pulses based on the sign of the error signal.

13. The system for tracking an incoming ultra wide bandwidth signal, as recited in claim 12, wherein adjacent pulses of the incoming pulses arrive at a predetermined interval, the predetermined interval being the time between the incoming pulses.

14. The system for tracking an incoming ultra wide bandwidth signal, as recited in claim 12, wherein the control circuit is configured to advance the phase of the local pulses by a set phase adjustment value if the sign of the error signal has a first value, and to retard the phase the local pulses by the set phase adjustment value if the sign of the error signal has a second value.

15. The system for tracking an incoming ultra wide bandwidth signal, as recited in claim 12, wherein the control circuit further determines a magnitude of the error signal, and modifies the phase of the local pulses based on both the sign of the error signal and the magnitude of the error signal.

16. The system for tracking an incoming ultra wide bandwidth signal, as recited in claim 15, wherein the control circuit is configured to advance the phase of the local pulses by a variable phase adjustment value if the sign of the error signal has a first value, wherein the control circuit is configured to retard the phase the local pulses by the variable phase adjustment value if the sign of the error signal has a second value, and wherein the variable phase adjustment value is determined by the magnitude of the error signal

* * * * *